(12) United States Patent
Umekida et al.

(10) Patent No.: US 8,057,314 B2
(45) Date of Patent: Nov. 15, 2011

(54) JOINT ASSEMBLY, A WHEEL BEARING APPARATUS, AND THE ASSEMBLIES INCLUDED IN AN AXLE MODULE

(75) Inventors: Mitsuru Umekida, Iwata (JP); Shigeaki Fukushima, Iwata (JP); Kiyoshige Yamauchi, Iwata (JP); Masahiro Ozawa, Iwata (JP); Hiroshi Kawamura, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/782,959

(22) Filed: May 19, 2010

(65) Prior Publication Data

US 2011/0053696 A1    Mar. 3, 2011

Related U.S. Application Data

(60) Division of application No. 12/142,926, filed on Jun. 20, 2008, now Pat. No. 7,753,801, which is a continuation of application No. PCT/JP2006/325547, filed on Dec. 21, 2006.

(30) Foreign Application Priority Data

| Dec. 22, 2005 | (JP) | ................................. 2005-370150 |
| Jan. 11, 2006 | (JP) | ................................. 2006-003353 |
| Jan. 19, 2006 | (JP) | ................................. 2006-011039 |
| Feb. 13, 2006 | (JP) | ................................. 2006-034924 |

(51) Int. Cl.
    *F16C 1/28*    (2006.01)

(52) U.S. Cl. .................................. 464/178; 280/93.512

(58) Field of Classification Search .................. 464/178, 464/906; 384/544; 280/93.512, 124.135
See application file for complete search history.

(56) References Cited

U.S. PATENT DOCUMENTS

| 3,962,889 | A | 6/1976 | Stillwagon, Jr. |
| 5,312,300 | A | 5/1994 | McGregor et al. |
| 5,749,261 | A | 5/1998 | Numakami |
| 6,644,858 | B2* | 11/2003 | Torii et al. |
| 6,739,422 | B2* | 5/2004 | Krude et al. ......... 280/93.512 X |
| 6,955,475 | B2* | 10/2005 | Tajima et al. .................. 384/544 |
| 7,841,949 | B2* | 11/2010 | Lee ................. 464/178 |
| 2004/0022469 | A1* | 2/2004 | Ozawa et al. ................. 384/544 |
| 2009/0069100 | A1 | 3/2009 | Umekida et al. |

FOREIGN PATENT DOCUMENTS

| DE | 27 17 029 A1 | 10/1978 |
| EP | 0 061 320 A1 | 9/1982 |
| JP | 57-171124 | 10/1982 |
| JP | 61-184128 | 11/1986 |
| JP | 2005-256938 | 9/2005 |
| SU | 1059306 | 12/1983 |

* cited by examiner

*Primary Examiner* — Gregory Binda
(74) *Attorney, Agent, or Firm* — Harness, Dickey & Pierce, P.L.C.

(57) ABSTRACT

A joint assembly has a pair of constant velocity universal joints and a connecting drive shaft. A cover unit protects the constant velocity universal joints and prevents hanging down of the joints under their own weight. The unit cover is arranged to cover the outer circumferential surfaces of the pair of constant velocity universal joints and boots. The unit cover is formed from elastomer material by injection molding. The cover unit inner circumferential surface has a configuration corresponding to the outline configurations of the pair of constant velocity universal joints and the boots.

7 Claims, 17 Drawing Sheets

(a)

(b)

(a)

(b)

JOINT ASSEMBLY, A WHEEL BEARING APPARATUS, AND THE ASSEMBLIES INCLUDED IN AN AXLE MODULE

CROSS-REFERENCE TO RELATED APPLICATIONS

This application is a divisional of U.S. Ser. No. 12/142,926, filed Jun. 20, 2008, now U.S. Pat. No. 7,753,801, which is a continuation of International Application No. PCT/JP2006/325547, filed Dec. 21, 2006, which claims priority to Japanese Application Nos. 2005-370150, filed Dec. 22, 2005; 2006-003353, filed Jan. 11, 2006; 2006-011039, filed Jan. 19, 2006; and 2006-034924, filed Feb. 13, 2006. The disclosures of the above applications are incorporated herein by reference.

FIELD

The present disclosure relates to a joint assembly with a pair of constant velocity universal joints and a connecting drive shaft. A wheel bearing apparatus is formed by a united combination of a secured type constant velocity universal joint and a double row rolling bearing. They rotationally support a vehicle wheel relative to a knuckle, which forms a suspension apparatus. A wheel bearing assembly (hereinafter referred to as an "axle module") includes the combination.

BACKGROUND

A power transmitting apparatus for transmitting the vehicle engine power, such as an automobile to the vehicle wheels, is required not only to transmit the engine power to the wheels but to enable radial and axial displacements and a moment displacement of the wheels caused by bounce of the wheel or turning of the vehicle during running on a rough road. Accordingly as shown in FIG. 18, an engine side (e.g. a transmission) and a wheel are connected via a drive shaft 100. One end is connected to a differential apparatus 102, via a slide type constant velocity universal joint 101, and the other end is connected to a wheel 105, via a wheel bearing apparatus 104 that includes a secured type constant velocity universal joint 103.

The wheel bearing apparatus 104 is a so-called "third generation" type wheel bearing 106. The secured type constant velocity universal joint 103 is detachably connected to the wheel bearing apparatus 106. In recent years, there has been a tendency to shift from the third generation structure to a so-called "fourth generation" structure. Here, the wheel bearing 106 and the secured type constant velocity universal joint 103 are combined as a unit.

In an axle module of a wheel bearing apparatus of the fourth generation, a constant velocity universal joint forms part of the wheel bearing apparatus. A drive shaft is connected to a pair of constant velocity universal joints, including the above constant velocity universal joints, and are combined as a unit. It is further know to combine a cover unit to improve the workability of the assembly of the axle module onto a vehicle as well as to protect a boots of the constant velocity universal joint during assembly and transportation of the axle module. As shown in FIG. 19, an axle module is formed by a wheel bearing apparatus that includes an outer member 50 formed with a body mounting flange 50b on its outer circumferential surface. The flange 50b is adapted to be mounted on a knuckle "N". A fitting surface 50c is inserted into the knuckle "N". Double row outer raceway surfaces 50a, 50a are on the outer member inner circumferential surface. An inner member 55, including a wheel hub 53, is inserted into the outer member 50 via double row balls 51, 51. The inner member 55 is integrally formed with a wheel mounting flange 52 on one end. Its outer circumferential surface has one inner raceway surface 53a opposite to one of the double row outer raceway surfaces 50a, 50a. An outer joint member 54 is formed with another inner raceway surface 54a on its outer circumferential surface. The inner raceway surface is opposite to the other one of the double row outer raceway surfaces 50a, 50a. A joint assembly "JA" is connected to the wheel bearing apparatus. In addition the outer diameter of the fitting surface 50c is formed larger than the maximum outer diameter of the constant velocity universal joint. An elastomeric cover unit 57 is formed as a cylindrical member to cover the periphery of the joint assembly "JA". The cover unit 57 is formed with contracted portions 57a, 57a at its opposite ends. The joint assembly "JA" has a pair of constant velocity universal joints 56, 58 and a drive shaft 59 connecting the two constant velocity universal joints 56, 58.

The cover unit 57 covers the periphery of the joint assembly "JA" and protects the joint assembly "JA" to make handling, such as transportation, easy. In addition, the elastic contracted portions 57a, 57b on the cover unit 57 enable easy mounting in a "one-touch" manner" of the cover unit 57 onto the outer joint member 54 of the constant velocity universal joint 56. Also, it prevents the cover unit 57 from falling out (see Japanese Laid-open Patent Publication No. 256938/2005).

SUMMARY

In such a prior art axle module, the constant velocity universal joints 56, 58 tend to hang down by their own weight. However, since the prior art cover unit 57 cannot prevent the hanging down, it is difficult to assemble the axle module onto the knuckle "N" and to handle it during packaging or transportation.

It is, therefore, an object of the present disclosure to provide a joint assembly with a pair of constant velocity universal joints and a connecting drive shaft. The drive shaft protects the constant velocity universal joints and prevents them from hanging down due to their own weight.

Another object of the present disclosure is to provide a wheel bearing apparatus that reduces weight and size and can improve the workability during assembly of it to a vehicle.

A further object of the present disclosure is to provide an axle module that improves the workability during assembly of it onto a vehicle. Additionally, it simplifies assembly and transportation.

A joint assembly is provided with a pair of constant velocity universal joints and a drive shaft connecting the constant velocity universal joints. One constant velocity universal joint of the pair of constant velocity universal joints is a secured type constant velocity universal joint. It includes an outer joint member formed with a plurality of curved and axially extending track grooves on its inner circumferential surface. A joint inner ring is formed with track grooves, opposite to the track grooves, on its outer circumferential surface. Torque transmitting balls are contained within ball tracks formed by the track grooves. A cage rollably holds the torque transmitting balls within the ball tracks. The drive shaft has one end connected to the joint inner ring. A boot is mounted on the drive shaft and on an outer circumferential portion at an opened side of the outer joint member. The other constant velocity universal joint, of the pair of constant velocity universal joints, is a slide type constant velocity universal joint connected to the other end of the drive shaft. A cylindrical cover unit is arranged to cover the outer circumferential surfaces of the pair of constant velocity universal joints and boots. The cover unit is formed of an elastomer by injection molding. The inner circumferential surface of the cover unit is configured to correspond to outline configurations of the pair of constant velocity universal joints and the boots.

According to the joint assembly, a pair of constant velocity universal joints have a drive shaft connected to the constant velocity universal joints. The cylindrical cover unit is arranged so that it covers the outer circumferential surfaces of the pair of constant velocity universal joints and boots. The cover unit is formed of an elastomer by injection molding. The inner circumferential surface of the cover unit is configured to correspond to outline configurations of the pair of constant velocity universal joints and their boots. Thus, it is possible to protect the constant velocity universal joints and prevent them from hanging down under their own weight.

It is preferable that the cover unit be separated in its radial direction. This enables easy assembly of the cover unit.

It is also preferable that the cover unit is formed so that it has an outline of a streamlined configuration recessed at substantially its center in an axial direction. This improves the workability during assembly of the axle module to the knuckle and reduces its weight and size.

Also provided is an axle module with a wheel bearing apparatus. The wheel bearing includes an outer member formed with a body mounting flange on its outer circumferential surface. The flange is adapted to be mounted onto a knuckle that forms a portion of a suspension apparatus. The outer member also includes a fitting surface. Double row outer raceway surfaces are formed on its inner circumferential surface. An inner member, includes a wheel hub that is integrally formed with a wheel mounting flange on one of its ends. Its outer circumferential surface has one inner raceway surface opposite to one of the double row outer raceway surfaces. The inner member also includes an outer joint member of the constant velocity universal joint that is adapted to be fit into the wheel hub. The constant velocity universal joint is formed with another inner raceway surface on its outer circumferential surface. The inner raceway surface is opposite to the other one of the double row outer raceway surfaces. A plurality of rolling elements are freely rollably contained between the inner member and the outer member. A joint assembly is connected to the wheel hub, via a torque transmittable manner. A cover unit covers the joint assembly. The outer diameter of the fitting surface of the outer member is formed larger than the outer diameter of the cover unit.

According to the axle module, since the outer diameter of the fitting surface of the outer member is formed larger than the outer diameter of the cover unit, it is possible to make assembly and transportation of the axle module easy and simple and thus improve its assembly onto a vehicle.

Further according to the present disclosure, a wheel bearing apparatus of a united combination of a wheel hub, a double row rolling bearing and a constant velocity universal joint comprises an outer member integrally formed with a body mounting flange on its outer circumferential surface. Its inner circumferential surface has double row outer raceway surfaces. An inner member include a wheel hub that is integrally formed with a wheel mounting flange on one end. Its outer circumferential surface has one inner raceway surface opposite to one of the double row outer raceway surfaces. A cylindrical portion axially extends from the one inner raceway surface. An outer joint member of the constant velocity universal joint is formed on its outer circumferential surface with another inner raceway surface opposite to the other one of the double row outer raceway surfaces. A shaft portion axially extends from the another inner raceway surface and is adapted to fit into the wheel hub. A plurality of rolling elements are freely rollably contained between the inner and outer raceway surfaces, respectively, of the inner member and the outer member. The wheel hub and the outer joint member are integrally connected, via plastic caulking deforming to radially expand a fitting portion of the shaft portion of the outer joint member. A hardened recessed and projected portion formed on the inner circumferential surface of the wheel hub bites into the outer circumferential surface of the shaft portion of the outer joint member. The recessed and projected portion is a crossed-groove formed by crossing substantially orthogonally a plurality of annular independent grooves, formed axially along the inner circumferential surface of the wheel hub and a plurality of axial grooves, formed equidistantly along the inner circumferential surface of the wheel hub. The biting of the hardened recessed and projected portion of the wheel hub into the shaft portion of the outer joint member is performed so that the material of the shaft portion does not extend to the bottoms of the axial grooves. Thus, voids remain in the recessed portions of the axial grooves.

In the wheel bearing apparatus of the fourth generation type, the wheel hub and the outer joint member are plastically connected to each other by caulking or radial expansion of the shaft portion of the outer joint member. The recessed and projected portion is a crossed-groove formed by crossing substantially orthogonally a plurality of annular independent grooves, formed axially along the inner circumferential surface of the wheel hub, and a plurality of axial grooves, formed equidistantly along the inner circumferential surface of the wheel hub. The biting of the hardened recessed and projected portion of the wheel hub into the shaft portion of the outer joint member is performed so that the material of the shaft portion does not extend into the bottoms of the axial grooves. Thus, voids remain in the recesses of the axial grooves. Accordingly, it is possible to provide a wheel bearing apparatus of the fourth generation type that can suppress deformation of the wheel hub, and thus generation of excessive stress in the wheel hub and has high durability and reliability for a long term.

It is preferable that the cross sectional configuration of each axial groove is formed with a recess with a circular arc and a projection of substantially straight lines. The biting of the recesses and projected portion into the shaft portion is suppressed by the projections so that the voids can remain in the recess. This suppresses deformation of the wheel hub and thus generation of excessive stress in the wheel hub.

It is also preferable that the included angle of the projection is set to substantially 90°. This increases the biting power and thus the reliability of the connection between the wheel hub and the outer joint member.

It is preferable that the diameter d1 of the bottom of the annular groove is set smaller than the diameter d2 of the bottom of the axial groove (i.e. $d1 \leq d2$). This improves an accuracy of machining during formation of the axial grooves using a broach after formation of the annular grooves while avoiding discontinuous cutting of the broach and suppressing vibrations during the machining.

Also provided is a wheel bearing apparatus with an outer member integrally formed with a body mounting flange on its outer circumferential surface. Its inner circumferential surface has double row outer raceway surfaces. An inner member includes a wheel hub that is integrally formed with a wheel mounting flange at one end. Its outer circumferential surface has one inner raceway surface opposite to one of the double row outer raceway surfaces. An outer joint member of the constant velocity universal joint is formed with another inner raceway surface on its outer circumferential surface. The inner raceway surface is opposite to the other one of the double row outer raceway surfaces. A plurality of rolling elements are freely rollably contained between the inner member and the outer member. The wheel hub and the outer joint member are integrally connected via a plastic deformation. The axial gap of the bearing, between the wheel hub and the outer joint member before the plastic deformation connection, is set to become a negative gap.

The wheel hub and the outer joint member are integrally connected via the plastic deformation. The axial gap of the bearing between the wheel hub and the outer joint member before the plastic deformation connection is set to become a negative gap. Thus, it is possible to stably measure the axial gap before the connection, via plastic deformation, using a rotational torque, to suppress influences of an angular run-out of the bearing, and to accurately control the bearing gap.

It is preferable that the negative gap between the wheel hub and the outer joint member before the plastic deformation connection of the two is increased by the plastic deformation connection and set to a predetermined axial gap. This makes it possible to exactly and stably measure an amount of gap variation due to plastic deformation machining and thus to obtain an optimum axial gap as well as to extend the service life of the bearing.

A wheel bearing apparatus comprises an outer member integrally formed with a body mounting flange adapted to be mounted on a knuckle. On its inner circumferential surface it is formed with double row outer raceway surfaces. An inner member includes a wheel hub that is freely rollably supported on the outer member. It is integrally formed at one end with a wheel mounting flange. Its outer circumferential surface has one inner raceway surface opposite to one of the double row outer raceway surfaces. A cylindrical portion axially extends from the one inner raceway surface. An outer joint member of the constant velocity universal joint is formed on its outer circumferential surface with another inner raceway surface opposite to the other one of the double row outer raceway surfaces. A shaft portion axially extends from the another inner raceway surface and is adapted to be fit into the wheel hub. A plurality of rolling elements are freely rollably contained between the inner member and the outer member. The wheel hub and the outer joint member are integrally connected via a plastic caulking deformation of the shaft portion of the outer joint member onto the inner circumferential surface of the wheel hub. An axially extending slit, having a substantially rectangular cross section, is formed on the inner circumferential surface of the knuckle. A boot is mounted on the outer joint member. A boot band, for fastening the boot, has a projection on its outer circumferential surface. The projection projects radially outward beyond the maximum outer diameter of the constant velocity universal joint. The boot is secured on the outer joint member by caulking the projection to reduce the diameter of the boot band. The configuration and dimension of the projection are determined so that the projection can pass through the slit of the knuckle.

The axially extending slit, having substantially rectangular cross section, is formed on the inner circumferential surface of the knuckle. The boot is mounted onto the outer joint member. The boot band, for fastening the boot, has a projection on its outer circumferential surface. The projection projects radially outward beyond the maximum outer diameter of the constant velocity universal joint. The boot is secured on the outer joint member by caulking the projection to reduce the diameter of the boot band. The configuration and dimension of the projection are determined so that the projection can pass through the slit of the knuckle. Thus, it is possible to arrange the knuckle around the wheel bearing apparatus and to provide a wheel bearing apparatus that can reduce the weight and size of the knuckle and suspension apparatus and improve the workability during assembly of the wheel bearing apparatus onto a vehicle.

It is preferable that the wheel hub and the outer joint member are integrally connected via a plastic caulking deformation by radially expanding the shaft portion of the outer joint member. A hardened recessed and projected portion, formed on the inner circumferential surface of the wheel hub, bites into the outer circumferential surface of the shaft portion of the outer joint member. This makes it possible to reduce the weight and size of the wheel bearing apparatus. Also, it improves the strength and durability of the wheel hub and keeps the pre-load amount of the wheel hub for a long term.

An axle module comprises the wheel bearing apparatus and a pair of constant velocity universal joints. A secured type constant velocity universal joint forms the wheel bearing apparatus and a slide type constant velocity universal joint is on the inner side. A drive shaft connects the pair of constant velocity universal joints. The maximum outer diameters of the pair of constant velocity universal joints are set smaller than the inner diameter of the knuckle. This makes it possible to arrange the knuckle around the wheel bearing apparatus and to provide a wheel bearing apparatus that can reduce the weight and size of the knuckle and suspension apparatus. Also, it improves the workability during assembly of the wheel bearing apparatus to a vehicle.

It is also preferable that the constant velocity universal joint of the inner side is formed by a tripod type constant velocity universal joint. It has an outer joint member with a cylindrical member, a shoulder forming the bottom of the cylindrical member, and a shaft portion axially extending from the shoulder. A tripod member has three legs projecting radially outward and spaced equidistantly from each other on its outer circumferential portion. Rollers are freely rollably mounted on the legs. This makes it possible to easily set the maximum outer diameter of the tripod type constant velocity universal joint smaller than that of the secured type constant velocity universal joint.

An axle module comprises a wheel bearing apparatus. The wheel bearing includes an outer member formed with a body mounting flange on its outer circumferential surface. The flange is adapted to be mounted on a knuckle forming a portion of a suspension apparatus. A fitting surface is on the outer member. Its inner circumferential surface has double row outer raceway surfaces. An inner member, includes a wheel hub that is integrally formed with a wheel mounting flange at one end. Its outer circumferential surface has one inner raceway surface opposite to one of the double row outer raceway surfaces. An inner ring or outer joint member of the constant velocity universal joint is adapted to fit into the wheel hub and formed is on its outer circumferential surface with another inner raceway surface opposite to the other one of the double row outer raceway surfaces. A plurality of rolling elements are freely rollably contained between the inner member and the outer member. A secured type joint is connected to the wheel hub in a torque transmittable manner. A drive shaft has one end that is connected to the constant velocity universal joint. A joint assembly includes a slide type constant velocity universal joint. A cylindrical cover unit is arranged so that it covers the outer circumferential surfaces of the pair of constant velocity universal joints and boots. The cover unit is formed from an elastomer material by injection molding. The cover unit inner circumferential surface has a configuration corresponding to outline configurations of the pair of constant velocity universal joints and boots. The outer diameter of the fitting surface of the outer member is formed larger than the outer diameter of the cover unit.

Further areas of applicability will become apparent from the below description. It should be understood that the description and specific examples are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

FIGS. 6(a) and 6(b) are cross-sectional explanatory view showing a gap measuring method during assembly.

FIGS. 7(a) and 7(b) are cross-sectional explanatory view showing rotational torque measuring method before and after caulking.

Figure 8:
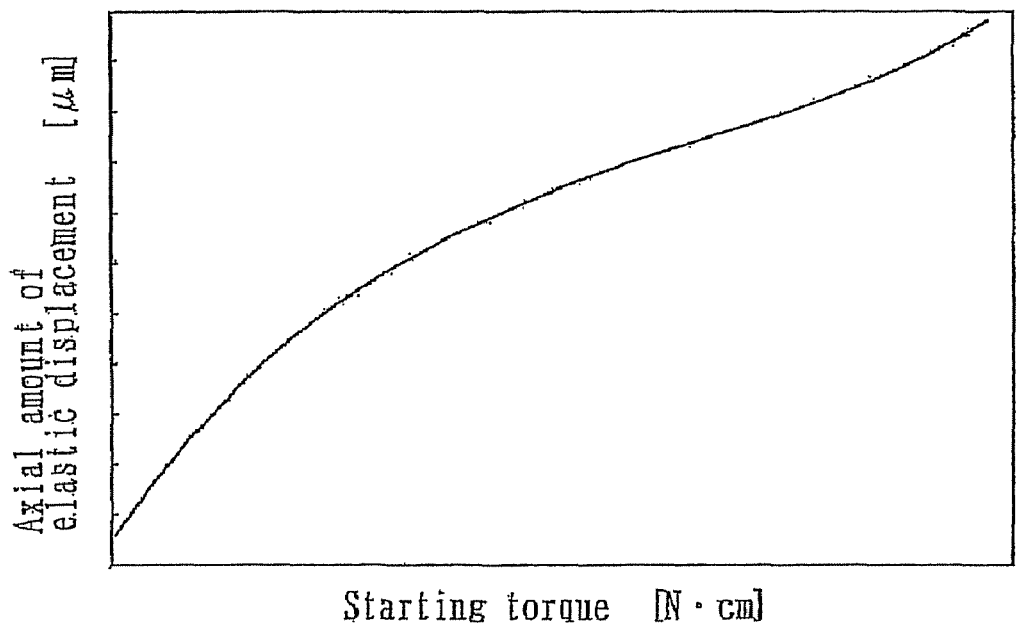

FIG. 8 is a graph showing a relation between a starting torque and an amount of elastic displacement in the axial direction.

Figure 9:
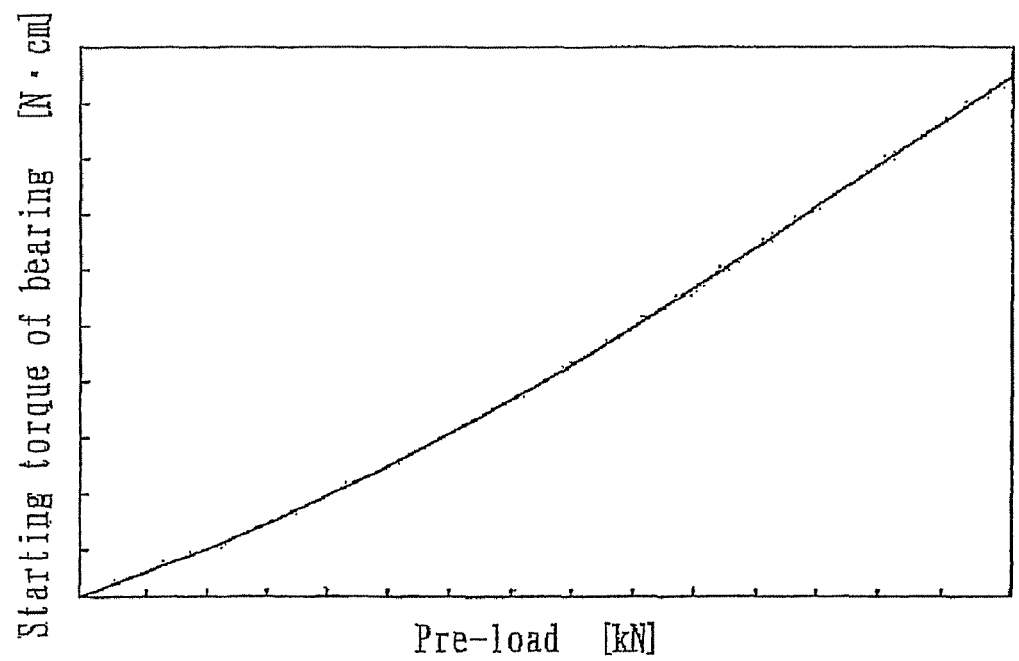

FIG. 9 is a graph showing a pre-load amount and a starting torque of the bearing.

Figure 1:
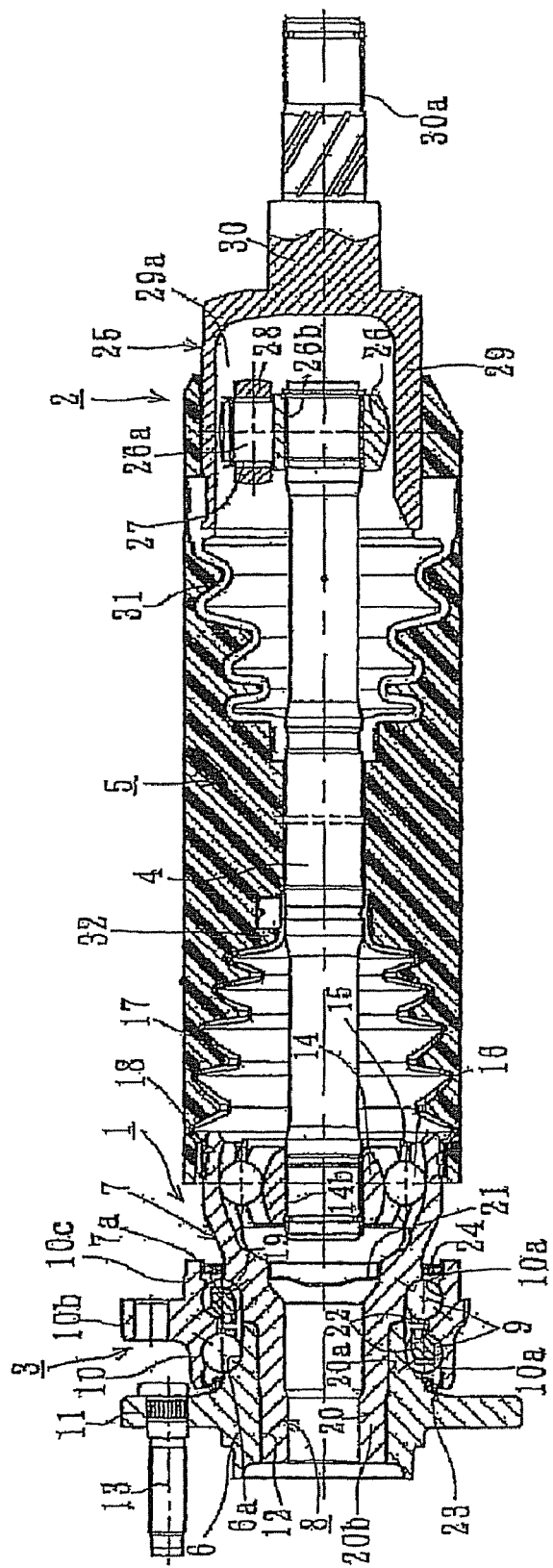
FIG. 1 is a longitudinal section view of a first embodiment of an axle module with a mounted cover unit.
Figure 10:
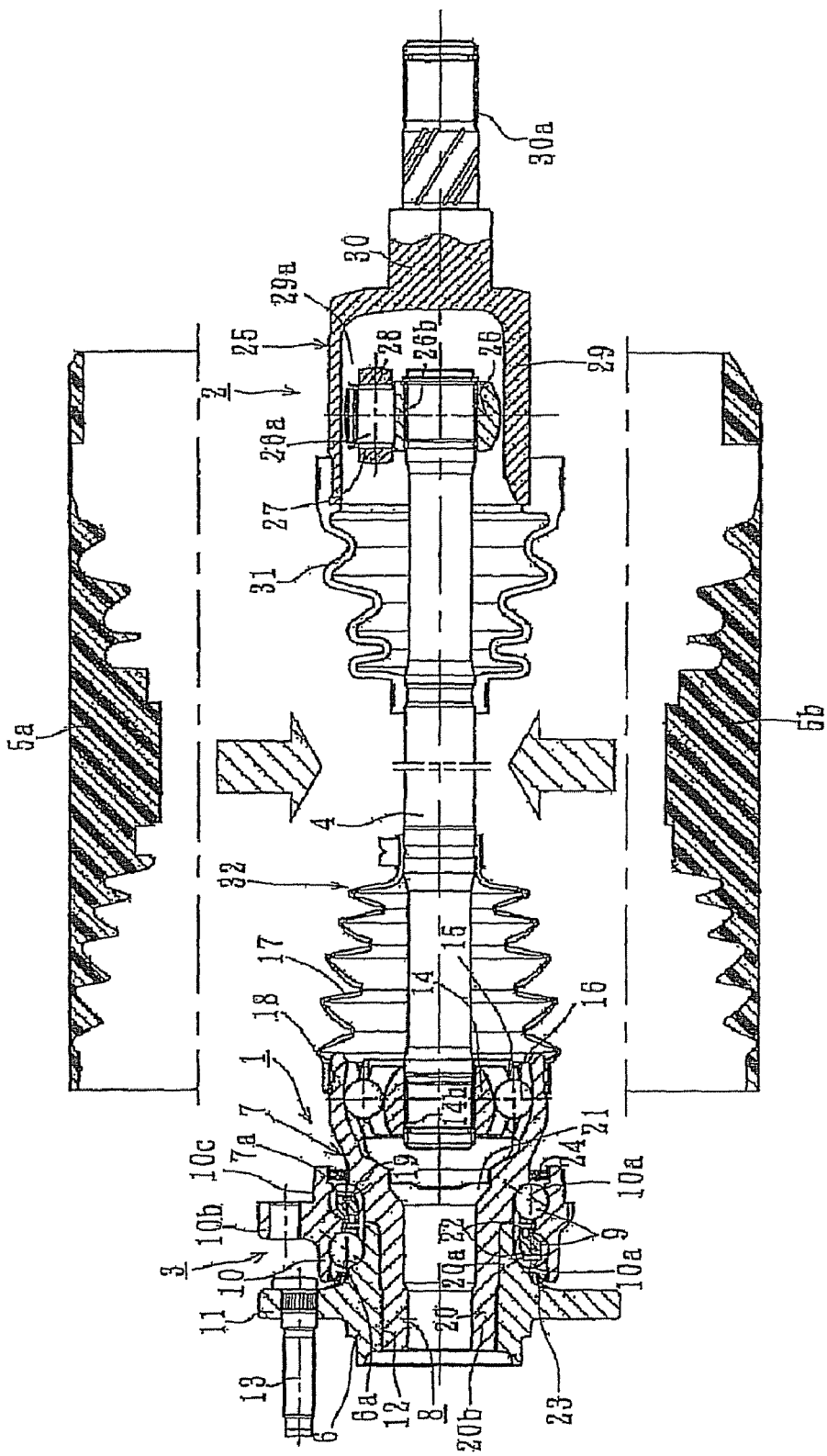

FIG. 10 is a cross-sectional explanatory view showing a method for assembling a cover unit of FIG. 1.

Figure 11:
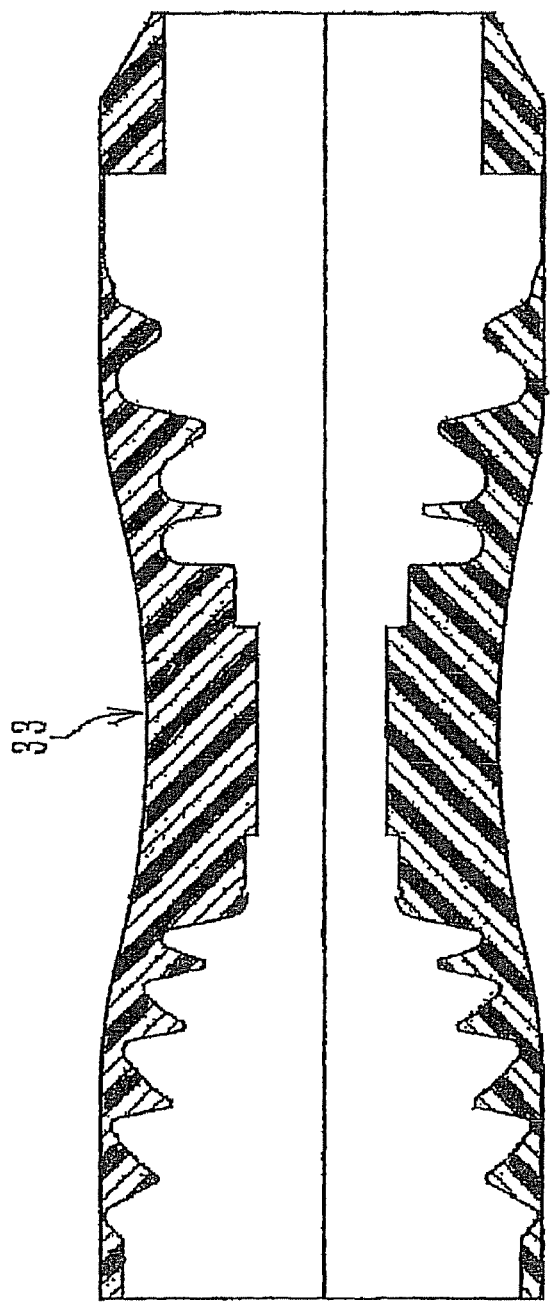

FIG. 11 is a longitudinal section view of another cover unit.

Figure 12:
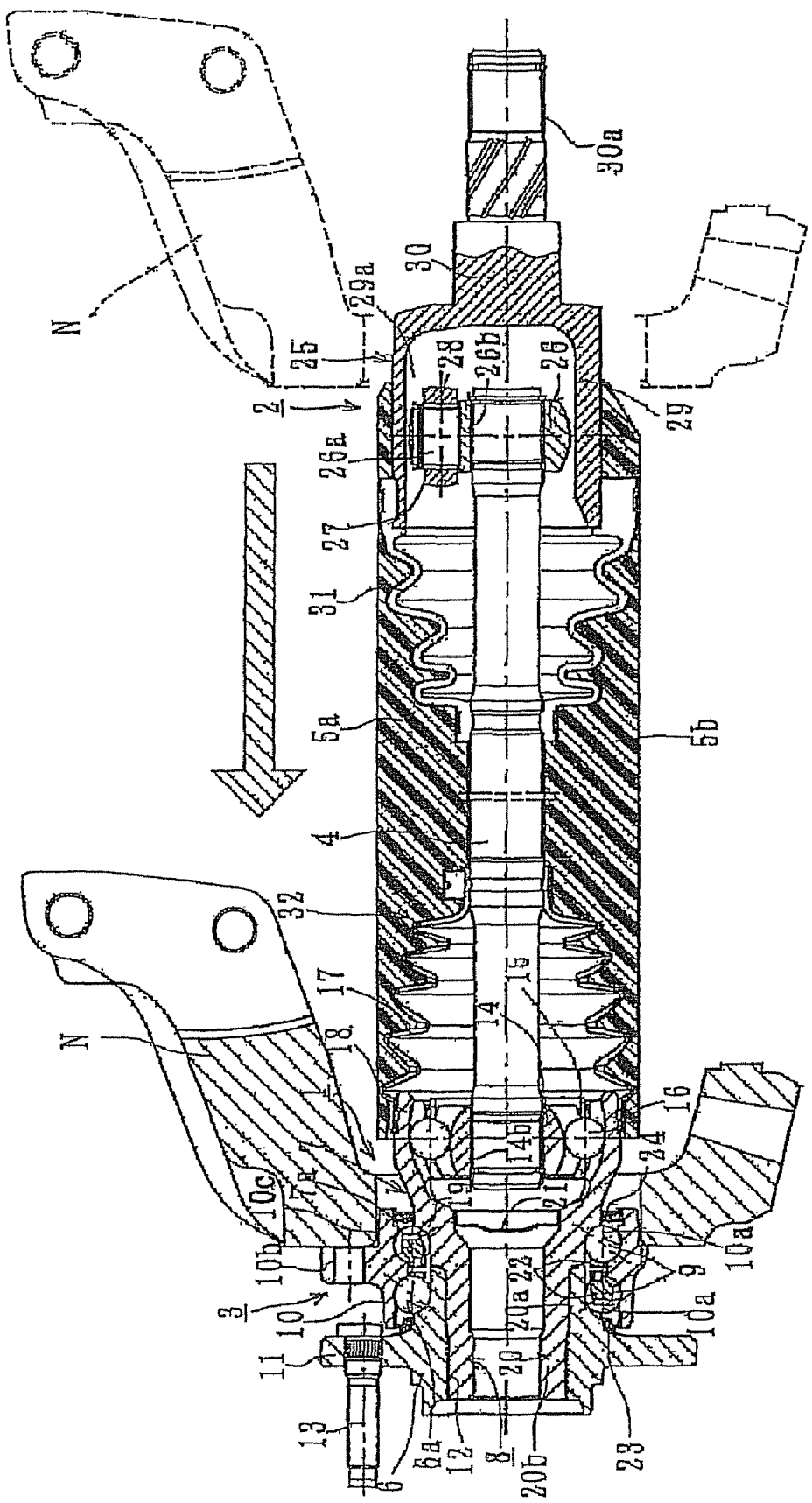

FIG. 12 is a cross-sectional explanatory view of a method for assembling the axle module and the knuckle.

Figure 13:
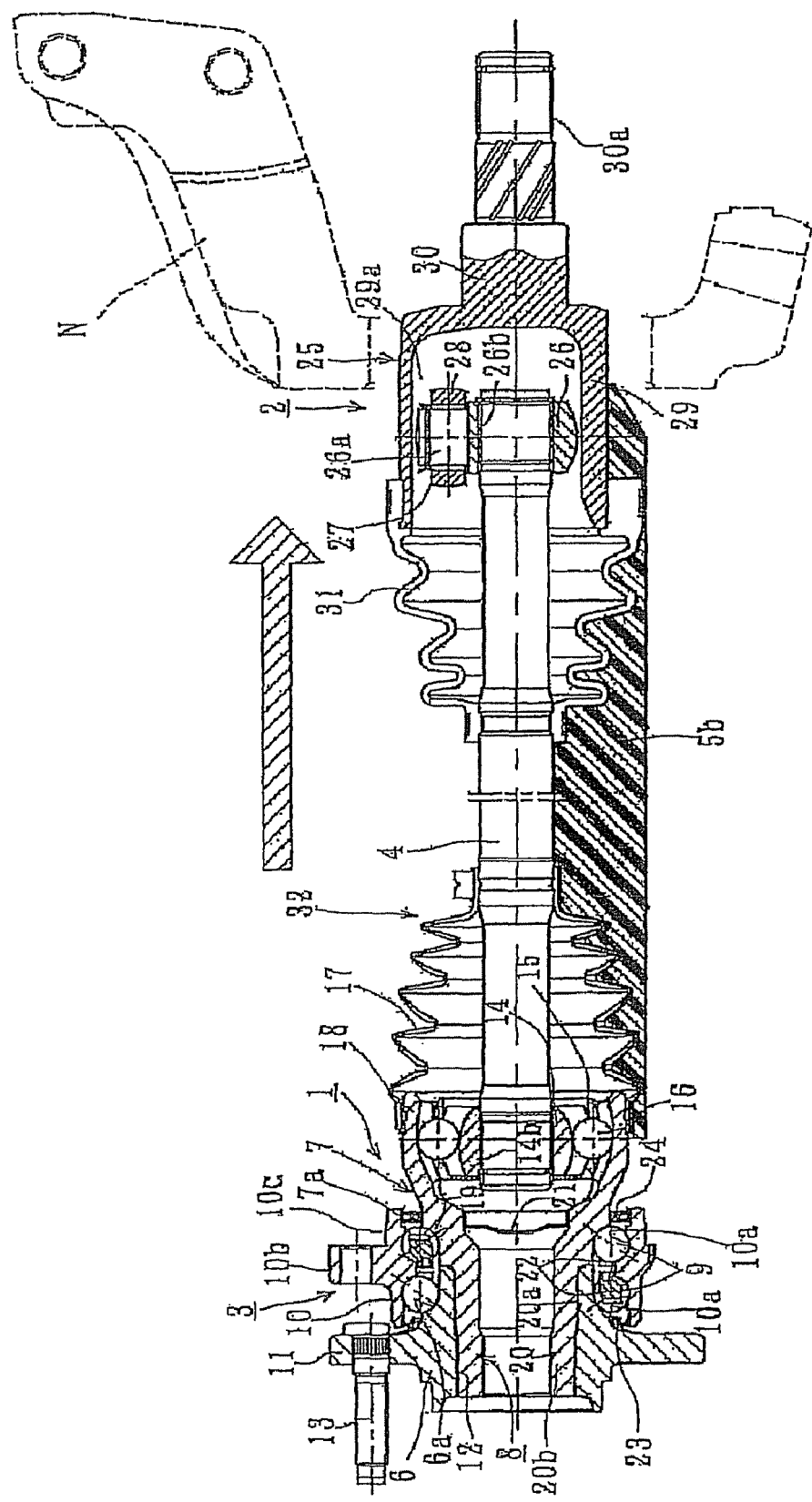

FIG. 13 is a cross-sectional explanatory view of another assembling method.

Figure 14:
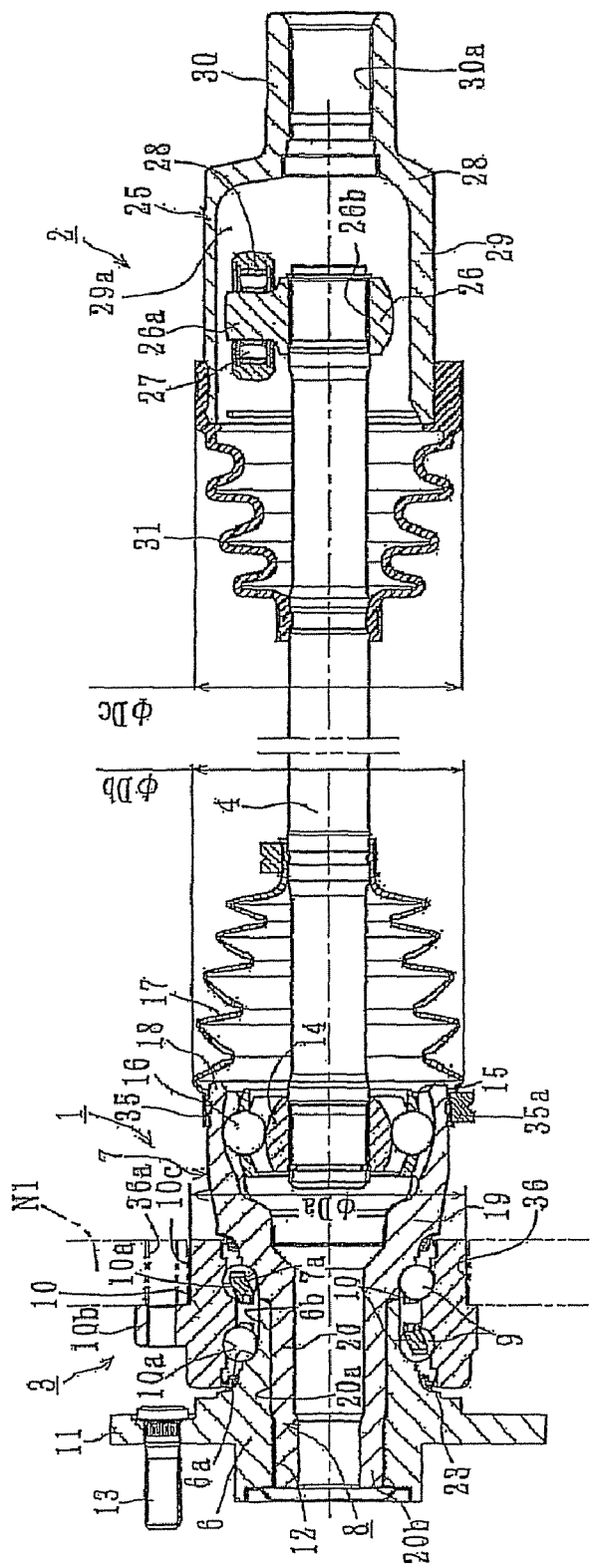

FIG. 14 is a longitudinal section view of a second embodiment of an axle module.

Figure 15:
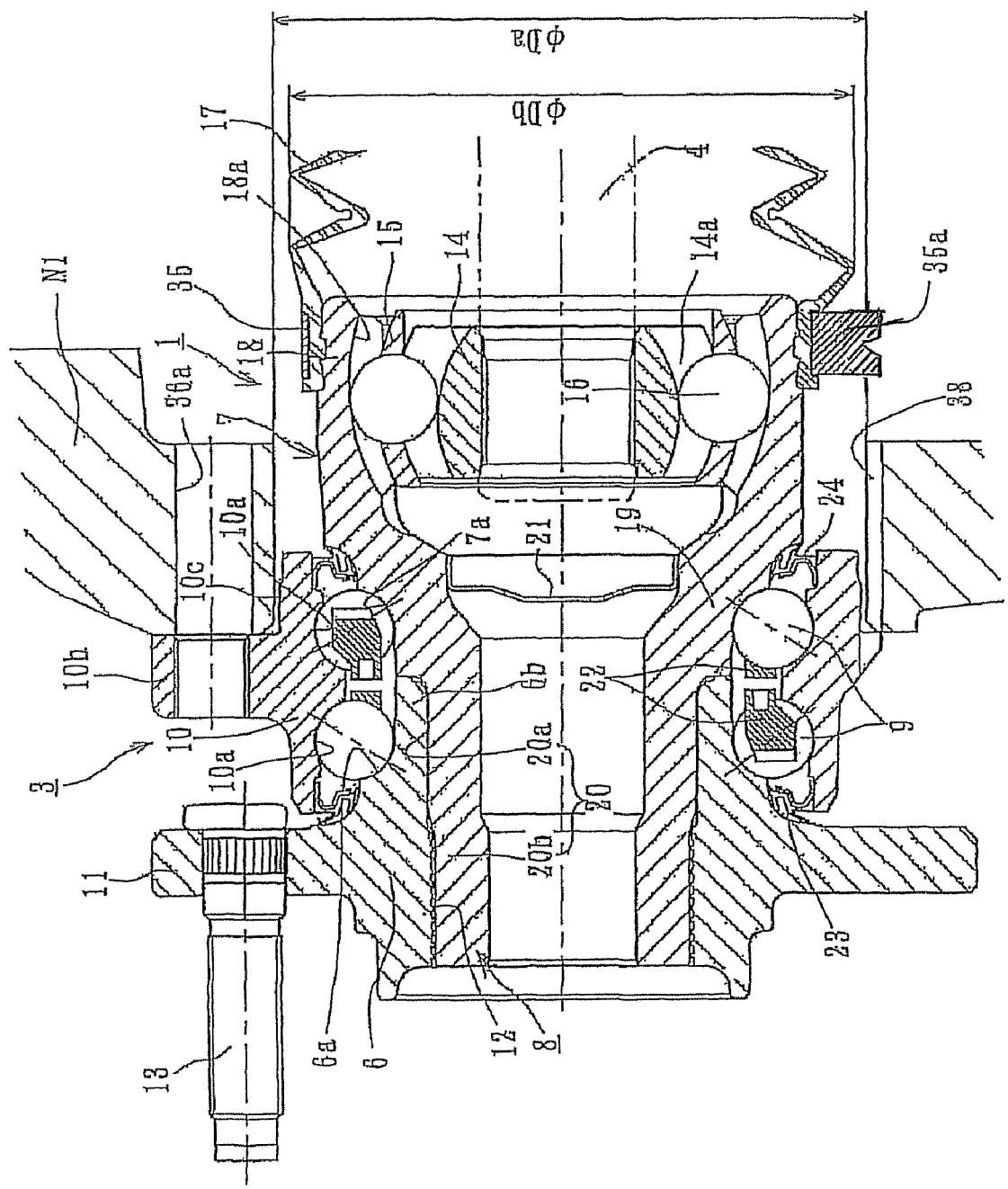

FIG. 15 is a longitudinal section view of a wheel bearing apparatus of FIG. 14.

FIG. 16(a) is a longitudinal section view of a knuckle.

FIG. 16(b) is a front elevation view of FIG. 16(a).

Figure 17:
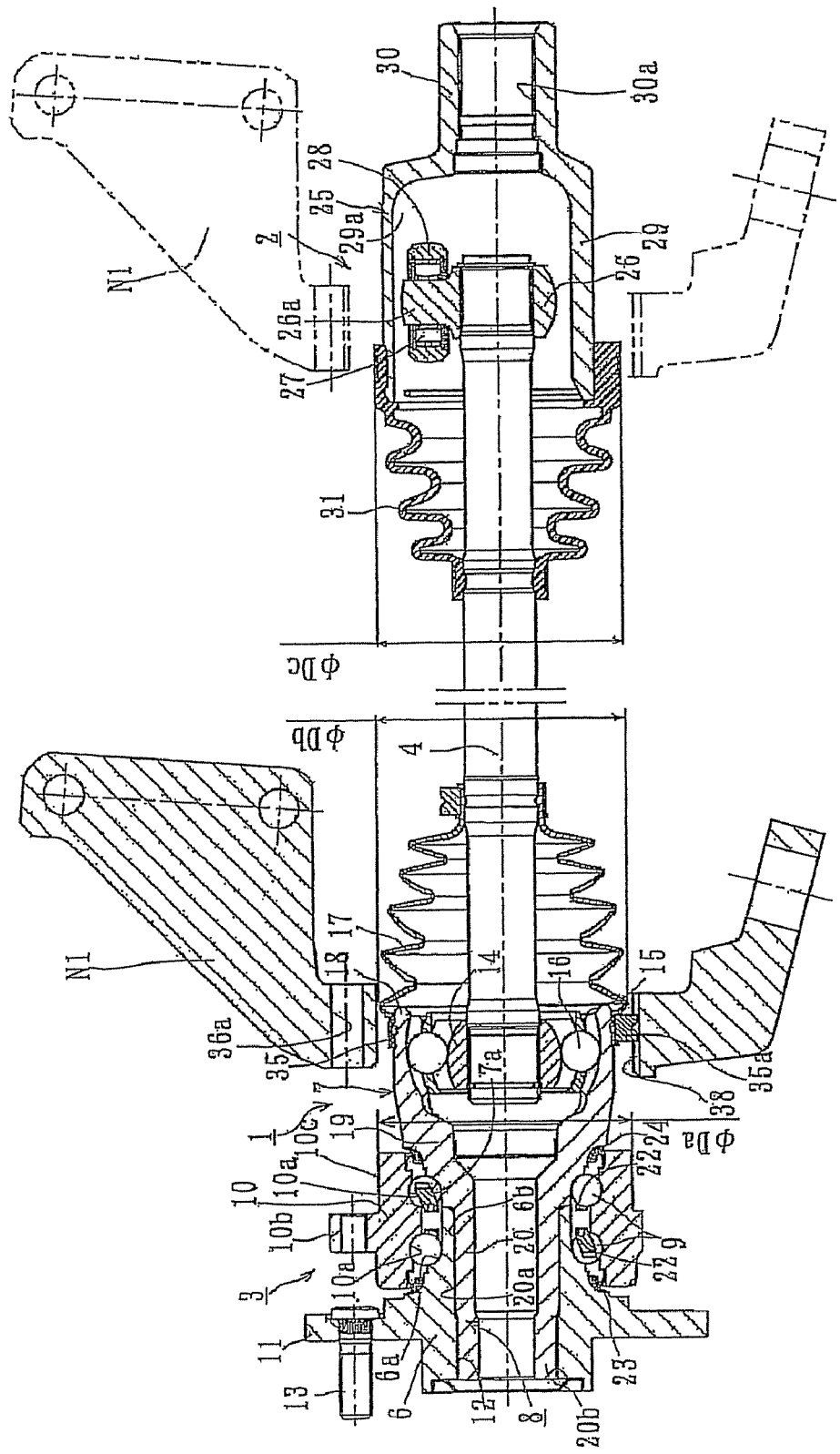

FIG. 17 is a cross-sectional explanatory view of a method for assembling the axle module to a vehicle.

Figure 18:
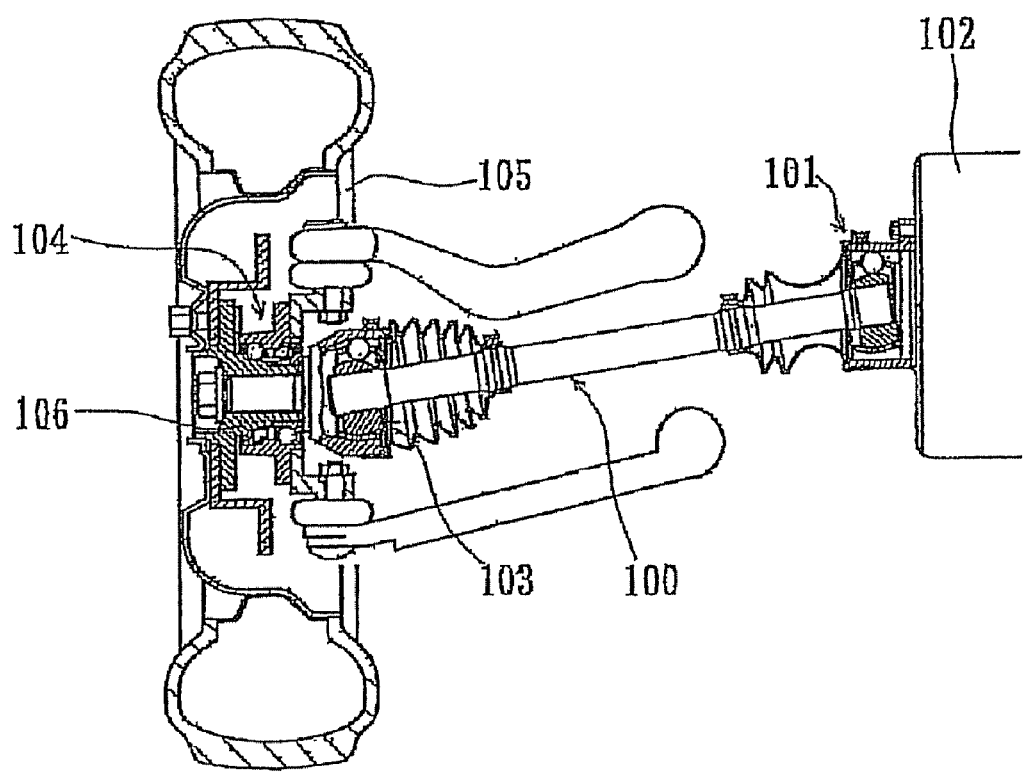

FIG. 18 is a longitudinal section view of an example of a power transmitting apparatus including a wheel bearing apparatus.

Figure 19:
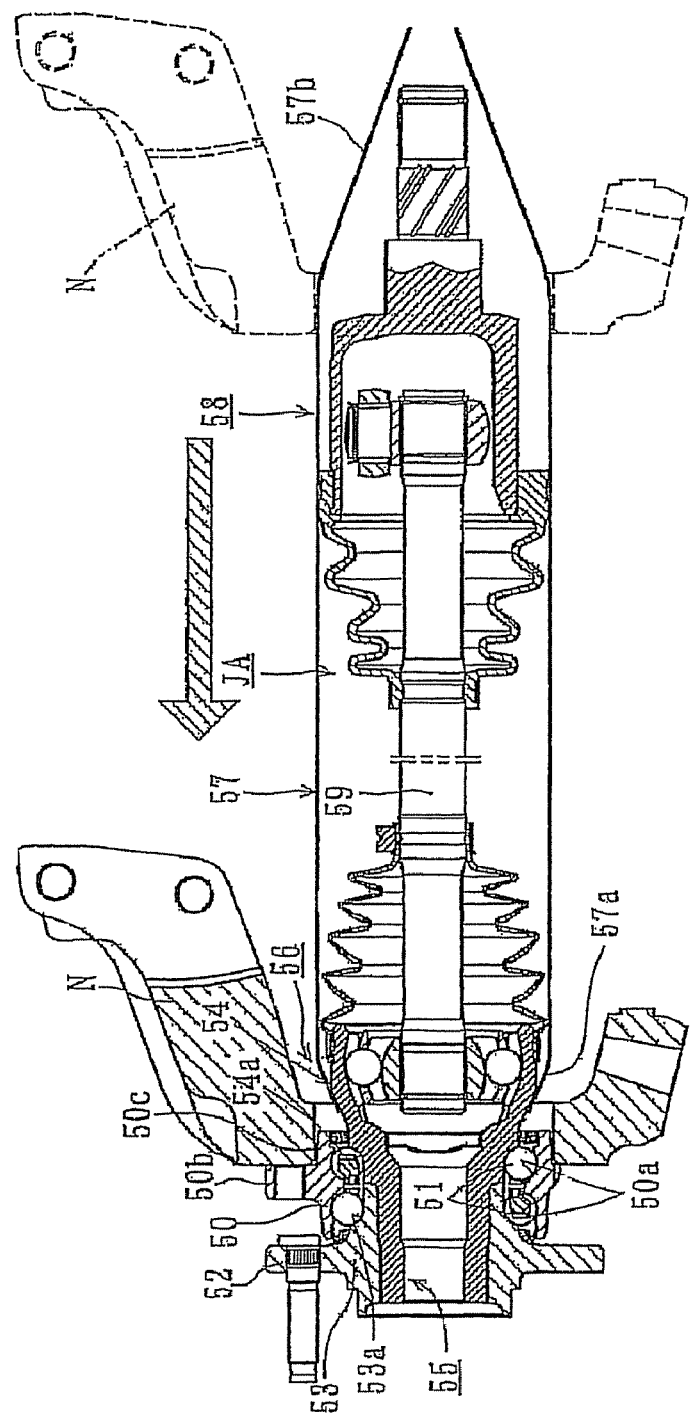

FIG. 19 is a longitudinal section view of an axle module with a prior art cover unit.

DETAILED DESCRIPTION

Figure 2:
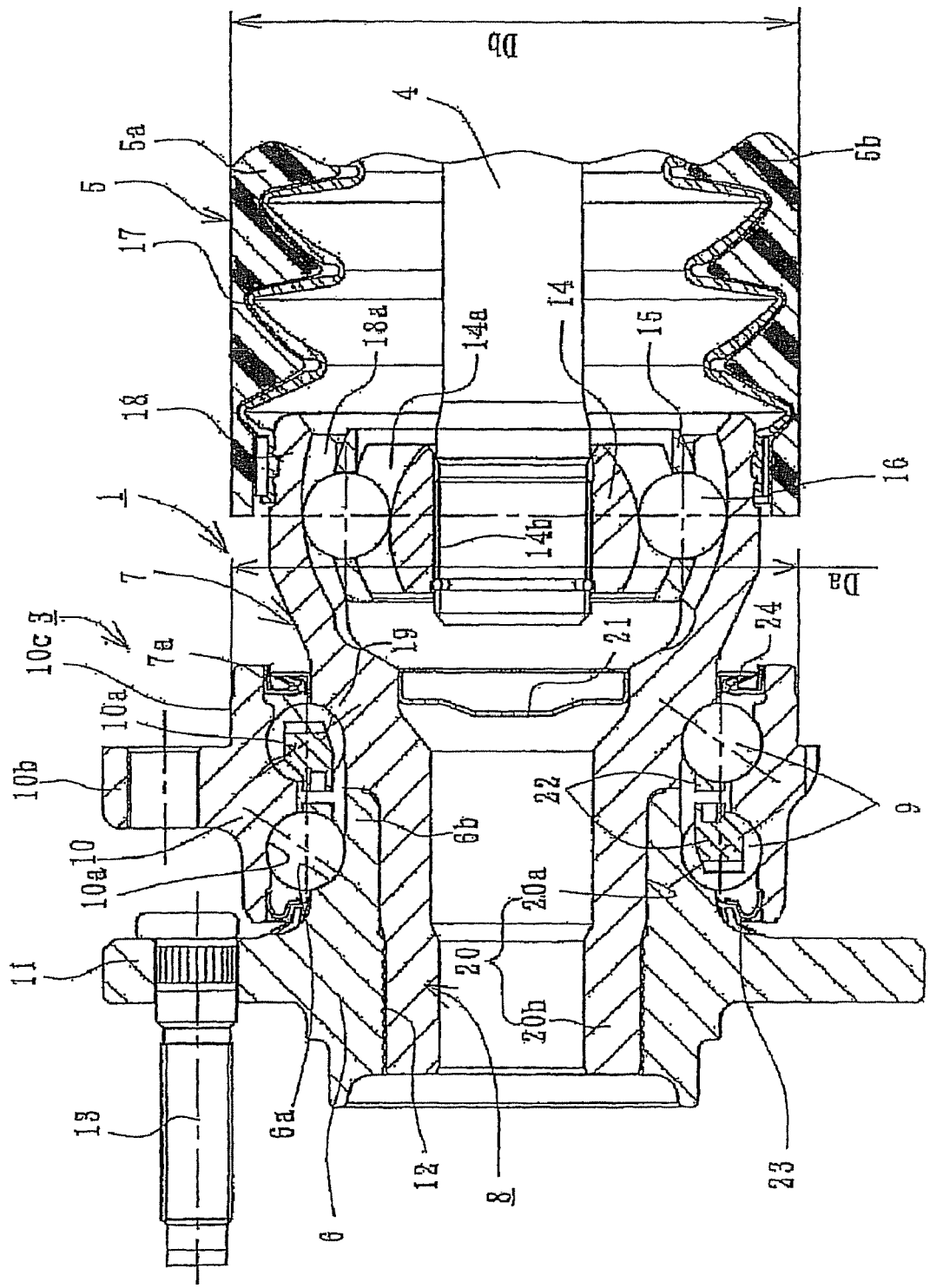
FIG. 2 is an enlarged longitudinal section view of a wheel bearing apparatus of FIG. 1.
Figure 3:
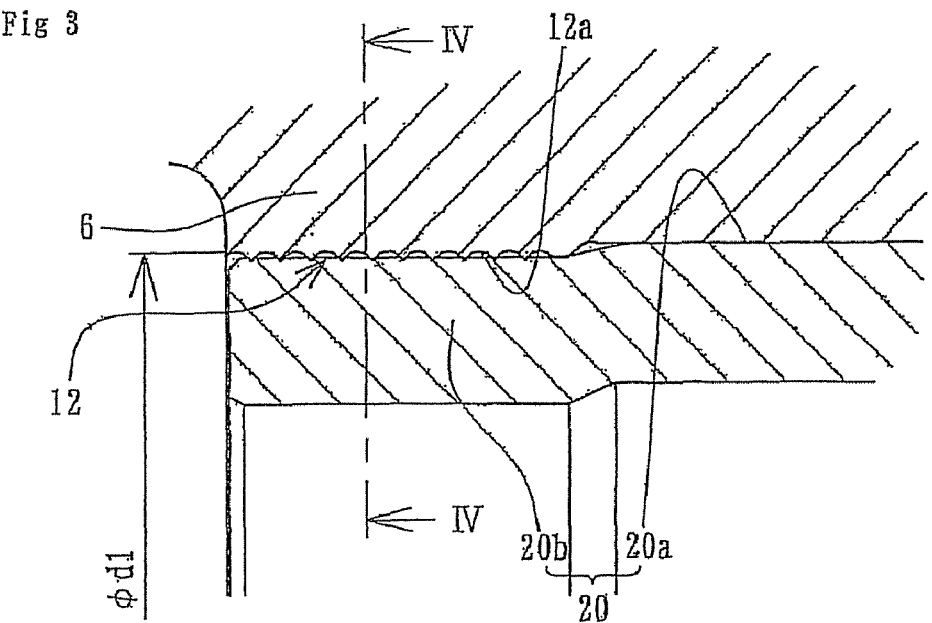
FIG. 3 is a partially enlarged cross-section view of FIG. 2.

The embodiments of the present disclosure will be described with reference to the drawings. FIG. 1 is a longitudinal section view of a first embodiment of an axle module with a mounted cover unit. FIG. 2 is an enlarged longitudinal section view of a wheel bearing apparatus of FIG. 1. FIG. 3 is a partially enlarged view of FIG. 2. FIG. 4(a) is a cross section view along line IV-IV of FIG. 3. FIG. 4(b) is a partially enlarged view of FIG. 4(a). FIG. 5(a) is a partially enlarged view of a condition before caulking. FIG. 5(b) is a partially enlarged view of a condition after caulking. FIGS. 6(a) and 6(b) are cross-sectional explanatory views of a gap measuring method during assembly. FIGS. 7(a) and 7(b) are cross-sectional explanatory views of a rotational torque measuring method before and after caulking. FIG. 8 is a graph showing a relation between starting torque and an amount of elastic displacement in the axial direction. FIG. 9 is a graph showing a pre-load amount and a starting torque of the bearing. FIG. 10 is a cross-sectional explanatory view of a method for assembling a cover unit of FIG. 1. FIG. 11 is a longitudinal section view of another cover unit. FIG. 12 is a cross-sectional explanatory view of a method for assembling the axle module and the knuckle. FIG. 13 is a cross-sectional explanatory view of another assembling method. In the description below, the term "outer side" (left hand side in the drawings) of the apparatus denotes a side that is positioned outside of the vehicle body. The term "inner side" (right hand side in the drawings) of the apparatus denotes a side that is positioned inside of the body when the bearing apparatus is mounted on the vehicle body.

As shown in FIG. 1, an axle module has a pair of constant velocity universal joint 1, 2, a wheel bearing apparatus and a drive shaft 4. The wheel bearing apparatus is formed as a unit of a double row rolling bearing 3 rotationally supporting a wheel (not shown). The outer side constant velocity universal joint 1 is connected by the drive shaft 4 to the inner side constant velocity universal joint 2. A cover unit 5 protects the pair of constant velocity universal joint 1, 2 and the drive shaft 4.

The double row rolling bearing 3 forming the wheel bearing apparatus has a so-called fourth generation structure (see FIG. 2). An inner member 8 includes a wheel hub 6 and an outer joint member 7 of the constant velocity universal joint 1. An outer member 10 is inserted around the inner member 8 via double row rolling elements (balls) 9, 9. The wheel hub 6 is made of medium carbon steel including carbon of 0.40~0.80% by weight such as S53C. A wheel mounting flange 11 is on the wheel hub outer side end portion. The wheel hub 6 is formed with an outer side inner raceway surface 6a on its outer circumferential surface. A cylindrical portion 6b axially extends from the inner raceway surface 6a. The wheel hub inner circumferential surface has a recessed and projected portion 12 hardened to have its surface hardness of 54~64 HRC. It is preferable to use high frequency induction heating as the heat treatment. The heating can be easily carried out local heating and setting of the depth of the hardened layer. A plurality of hub bolts 13 are mounted on the wheel mounting flange equidistantly spaced along the periphery of the wheel mounting flange 11.

Figure 4:
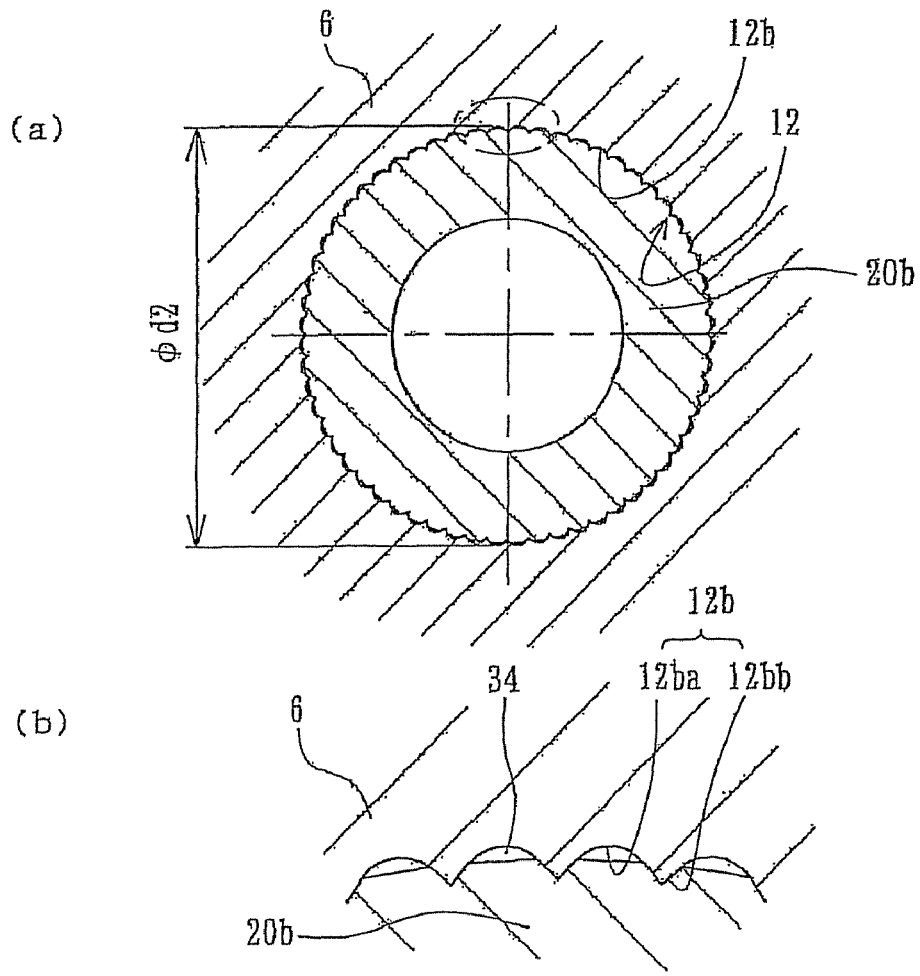
FIG. 4(a) is a cross section view along line IV-IV of FIG. 3.
FIG. 4(b) is a partially enlarged view of FIG. 4(a).
Figure 5:
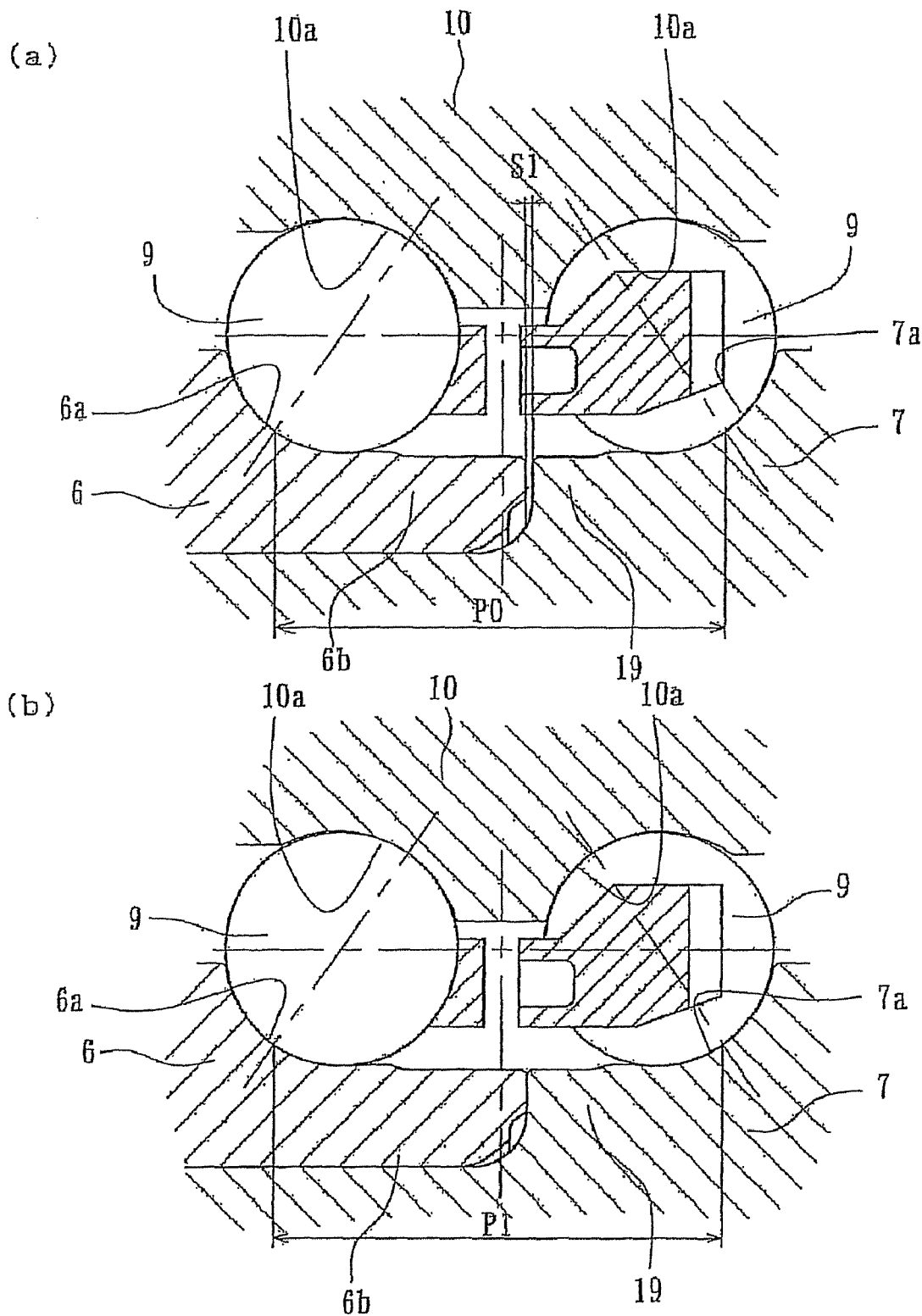
FIG. 5(a) is a partially enlarged cross-section view of a condition before caulking.
FIG. 5(b) is a partially enlarged cross-section view of a condition after caulking.

As seen in FIGS. 3 and 4, the recessed and projected portion 12 of the wheel hub 6 includes a crossed-groove formed by crossing substantially orthogonally a plurality of annular independent grooves 12a. The grooves 12a are formed by turning axially along the inner circumferential surface of the wheel hub 6. A plurality of axial grooves 12b, formed by broaching, are equidistantly positioned along the inner circumferential surface of the wheel hub 6. Although not shown in the drawings, the crossed-groove may be formed by helical grooves inclined in opposite directions to each other.

A bottom diameter d1 of the annular grooves 12a and a bottom diameter d2 of the axial grooves 12b are perfectly equalized. Thus, the height of the circumferential projections and the axial projections are equalized with each other to form a group of pyramids. Each pyramid has a sharp projecting tip project of the recessed and projected portion 12. However, it is difficult in practice to equalize the bottom diameters d1, d2 to each other since machined surfaces formed by turning and broaching exist in a mingled manner. Accordingly, in the present disclosure the bottom diameter d1 of the annular grooves 12a is set smaller than the bottom diameter d2 of the axial grooves 12b (d1≦d2). This improves the machining accuracy by suppressing vibration in the machining process to avoid discontinuous cutting during formation of the axial grooves 12b after the formation of the annular grooves 12a.

The amount of radial expansion of the fitting portion 20b of the constant velocity outer joint shaft portion 20 is suppressed so that the material of the shaft portion 20 does not extend into the bottoms of the axial grooves 12b. Thus, voids 34 remain in the recessed portions 12ba of the axial grooves 12b as shown in FIG. 4(b). More in detail, the cross sectional configuration of each axial groove 12b is formed by the recess (bottom of groove) 12ba with a circular arc. A projection (tip) 12bb is formed by substantially straight lines, with the included angle of the projection 12bb set to be substantially 90°. The biting of the recessed and projected portion 12 into the shaft portion 20 is suppressed by projections 12bb, formed by its linear outline, so that the void 34 can remain in the recess 12ba. This enables suppressed deformation of the wheel hub 6 and thus excessive stress in the wheel hub 6. Accordingly, it is possible to provide the wheel bearing apparatus of the fourth generation type that can keep the durability for a long term and improve its reliability.

The outer member 10 is made of medium carbon steel including carbon of 0.40~0.80% by weight such as S53C. It is integrally formed with a body mounting flange 10b on its outer circumferential surface. The body mounting flange 10b is mounted on a knuckle (not shown), forming a suspension apparatus of a vehicle. The inner circumferential surface of the outer member has double row outer raceway surfaces 10a, 10a. The double row outer raceway surfaces 10a, 10a are hardened by high frequency induction quenching to have a surface hardness of 58~64 HRC.

The constant velocity universal joint 1 includes the outer joint member 7, a joint inner ring 14, a cage 15 and torque transmitting balls 16. The outer joint member 7 is made of medium carbon steel including carbon of 0.40~0.80% by weight such as S53C. It is integrally formed with a cup shaped mouth portion 18. A plastic boot 17 is mounted around the periphery of an opening. A shoulder 19 forms a bottom of the mouth portion 18. The other (inner side) inner raceway surface 7a is formed on its outer circumferential surface. A hollow shaft portion 20 axially extends from the shoulder portion 19. The shaft portion 20 is formed with a spigot portion 20a on its outer circumferential surface. The spigot portion 20a is fit into the cylindrical portion 6b of the wheel hub 6 via a predetermined interference. A fitting portion 20b axially extends from the spigot portion 20a. In addition, leakage of lubricating oil contained in the mouth portion 18 and ingress of rain water or dusts into inside of the joint from the outside can be prevented by the boot 17 and an end cap 21. The end cap 21 is fit into the shoulder 19 of the outer joint member 7.

The mouth portion 18 is formed with eight curved track grooves 18a on its inner circumferential surface. The joint inner ring 14 is formed with eight track grooves 14a on its outer circumferential surface. The eight track grooves 14a correspond to the track grooves 18a. The torque transmitting balls 16 are contained between the track grooves 18a, 14a and are held by the cage 15. The track grooves 18a, the shoulder portion 19 and the shaft portion 20 are hardened to have a surface hardness of 58~64 HRC. However, the fitting portion 20b of the shaft portion 20 remains non-hardened.

Double row balls 9, 9 are contained between the double row inner raceway surfaces 6a, 7a, of the inner member 8, and the double row outer raceway surfaces 10a, 10a, of the outer member 10. The balls 9, 9 are freely rollably held by cages 22, 22. Seals 23, 24 are arranged in annular openings formed between the outer member 10 and the wheel hub 6, to prevent leakage of lubricating oil contained in the bearing and ingress of rain water or dusts into the bearing from the outside.

The shaft portion 20 of the outer joint member 7 is press fit into the wheel hub 6 via an interference fit having some interference. In this condition, as shown in FIG. 5(a), the axial gap of the bearing is set to a negative gap in the pitch dimension P0. An axial gap S1 is formed between the end face of the cylindrical portion 6b and the shoulder portion 19 of the outer joint member 7. The wheel hub 6 and the outer joint member 7 are integrally connected via a plastically deformed caulking by inserting an expanding tool, such as a mandrel into the fitting portion 20b of the shaft portion 20 from the outer side. The fitting portion 20b is radially expanded and bites into a hardened recessed and projected portion 12 formed on the inner circumferential surface of the wheel hub 6. The end face of the cylindrical portion 6b of the wheel hub 6 is butted against the shoulder portion 19 of the outer joint member 7 by the caulking process as shown in FIG. 5(b). Accordingly, the axial gap of the bearing is further increased by a gap S1 as a negative gap and becomes a predetermined axial gap of a pitch dimension P1 (P1=P0−P1). Thus, it is possible to easily and stably control the negative gap of the bearing since the axial gap of the bearing can be additionally reduced by the caulking process.

Figure 6:
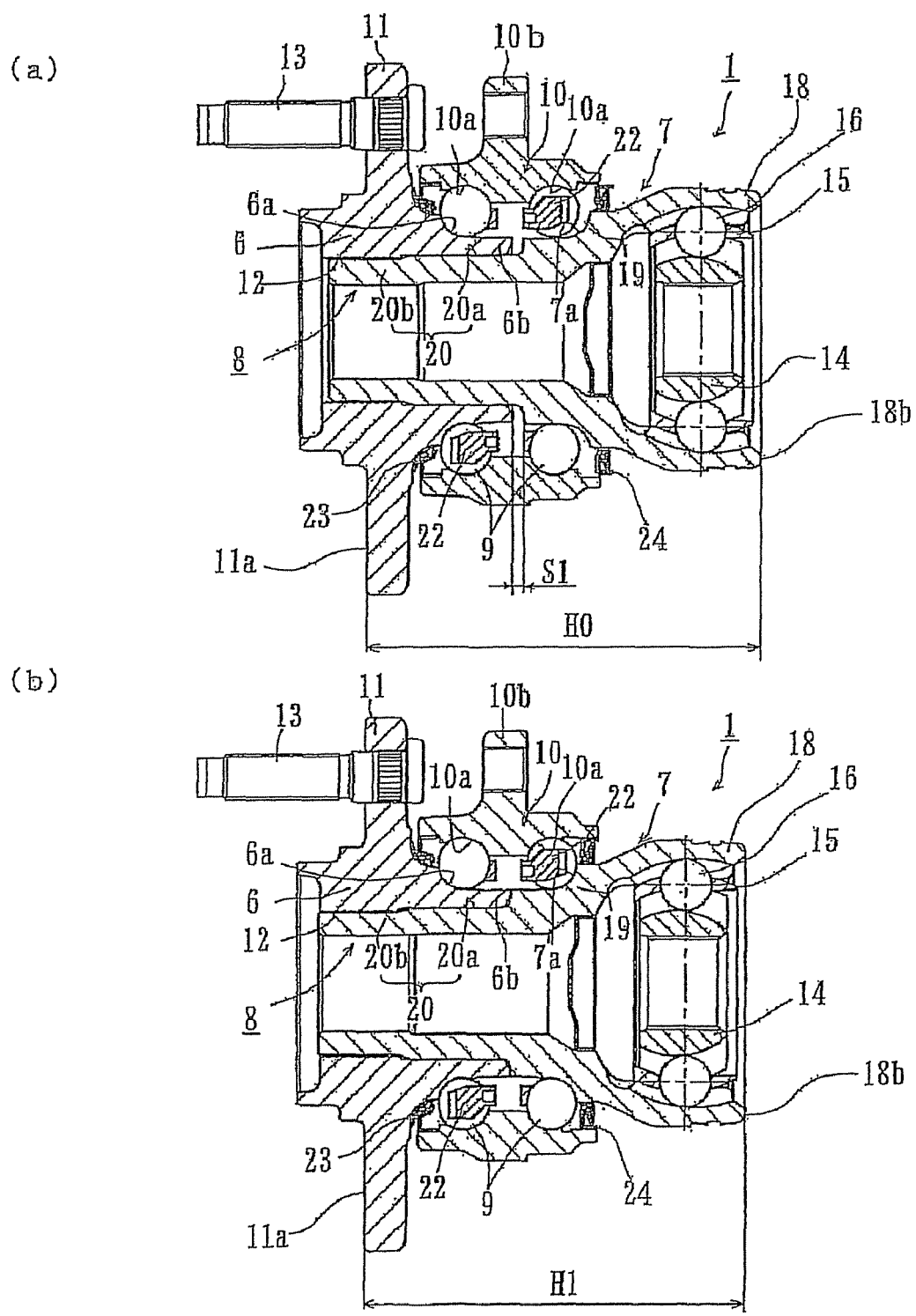
Figure 7:
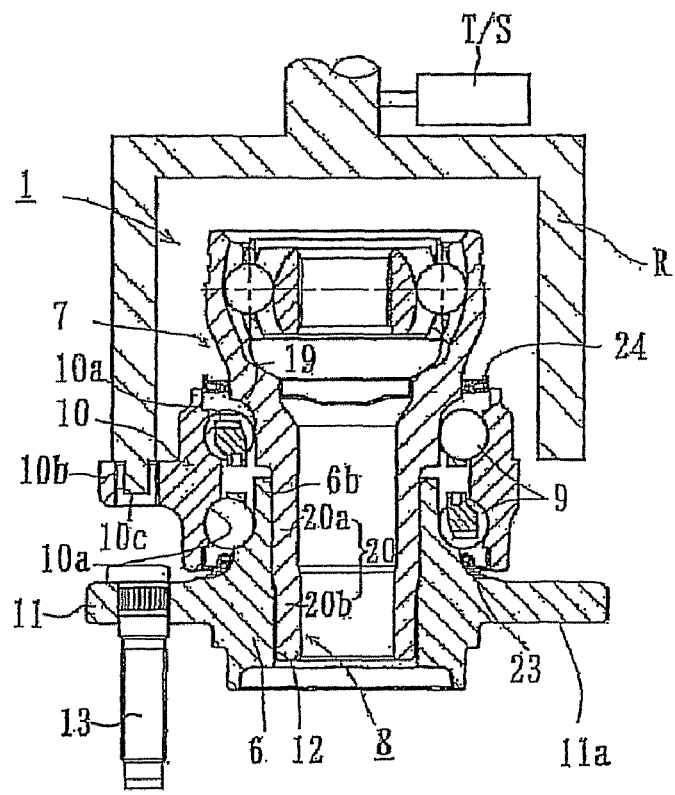
Figure 7:
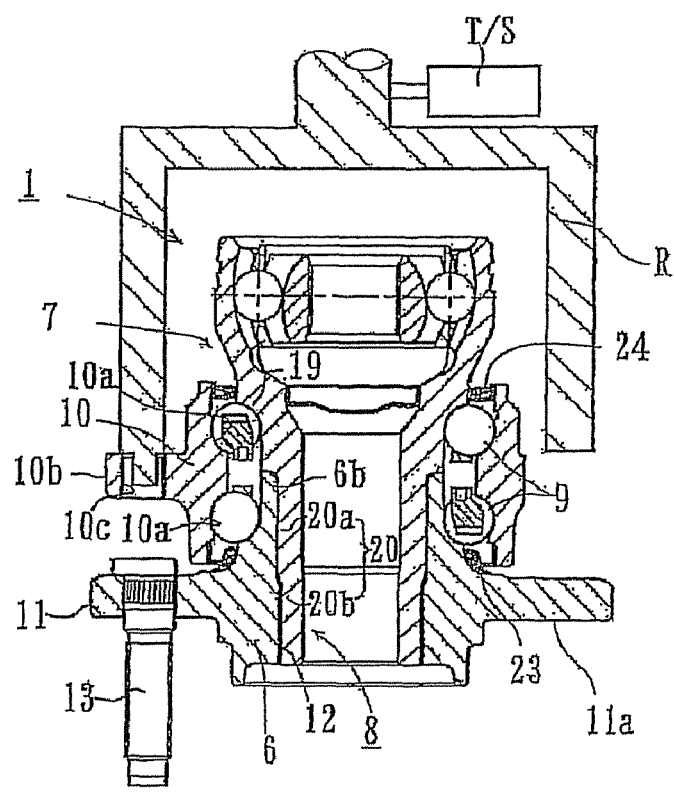

A method for measuring the bearing gap during the assembly of the wheel bearing apparatus will be described using FIGS. 6 and 7. As shown in FIG. 6(a), the outer joint member 7 is press fit into the cylindrical portion 6b of the wheel hub 6 and stopped just before the shoulder portion 19 of the outer joint member 7 is butted against the cylindrical portion 6b of the wheel hub 6. At this point of time, the axial gap of the bearing is positive and the predetermined axial gap S1 remains between the cylindrical portion 6b of the wheel hub 6 and the shoulder 19 of the outer joint member 7. In this condition, an axial dimension H0, from a reference surface (end face of the mouth portion 18) 18b of the outer joint member 7 to a reference surface (side face of the flange 11) 11a, is measured and an initial axial gap δ0 of the bearing is measured from an axial shift amount of the outer member 10 relative to the inner member 8.

As shown in FIG. 6(b), the outer joint member 7 is press fit into the wheel hub 6 until the shoulder portion 19 of the outer joint member 7 abuts against the end face of the cylindrical portion 6b. An axial dimension H1, from the reference surface 18b of the outer joint member 7 to the reference surface 11a of the wheel hub 6 is measured. Thus the axial gap δ in this case can be calculated from the following formula:

$$\delta 1 = \delta 0 - (H0 - H1)$$

According to the present disclosure, the axial gap δ1 of the bearing before the caulking is set negative in this case. Thus, it is possible to stop the press fitting of the outer joint member 7 while retaining a slight axial gap in place of press fitting the outer joint member 7 into the wheel hub 6 until the shoulder 19 abuts against the cylindrical portion 6b to obtain a desirable bearing gap (negative gap) by pushing the outer joint member 7 toward the outer side by the caulking process and then by abutting the shoulder portion 19 of the outer joint member 7 against the cylindrical portion 6b of the wheel hub 6.

On the other hand, the rotational torque T1 before the caulking process of the bearing is measured as shown in FIG. 7(a). The rotational torque of a rotational member "R" is measured by longitudinally placing the wheel bearing apparatus and mounting the rotational member "R" on the body mounting flange 10b of the outer member 10. In this case, the rotational torque T1 of the bearing before the caulking can be measured by a torque measuring instrument T/S. The axial gap δ1 is set to a negative gap. The rotational member "R" is rotated by engaging the rotational member "R" with a bolt inserting through aperture 10c formed in the body mounting flange 10b. Accordingly, it is possible to stabilize the measurement of rotational torque, to suppress an influence of the angular run-out of the bearing to the measurement and to accurately measure the rotational torque.

The wheel hub 6 and the outer joint member 7 are integrally connected via a plastically deformed caulking by inserting an expanding tool, such as a mandrel, into the fitting portion 20b of the shaft portion 20 from the outer side. The fitting portion 20b is radially expanded so that the hardened recessed and projected portion 12 formed on the inner circumferential surface of the wheel hub 6 bites into the fitting portion 20b of the shaft portion 20. The rotational torque T2 of the bearing after the caulking is measured by the torque measuring instrument T/S as shown in FIG. 7(b). In the present disclosure the negative gap of the bearing is increased by the caulking and the rotational torque T2 after the caulking is increased as compared with the rotational torque T1 before the caulking (T2>T1). Although the measurement of the rotational torque of the bearing is illustrated and described, a starting torque of the bearing may be measured in place of the measurement of the rotational torque.

There is a correlation between the pre-load amount and the rotational torque (or the starting torque) and the amount of elastic displacement. Accordingly, the rotational torque T can be obtained by previously setting a relationship formula from the relation between the rotational torque and the amount of elastic displacement by substituting the axial gap δ1 after press fitting of the outer joint member 7 into the cylindrical portion 6b of the wheel hub 6 for the relationship formula. FIG. 8 is an example showing the relationship between the starting torque of the bearing and the amount of elastic displacement. Furthermore the rotational torque T3 (T3=T+ΔT) can be obtained by adding a torque increment ΔT (ΔT=T2−T1) to the rotational torque T. The amount of elastic displacement of the bearing can be obtained by substituting the rotational torque T3 for the relation formula between the rotational torque and the amount of elastic displacement. This amount of elastic displacement becomes the axial gap (negative gap) of the bearing after caulking. In addition, it is possible to obtain the pre-load amount of the bearing by substituting the rotational torque T3 for the relation formula between the pre-load amount and the rotational torque. FIG. 9 is an example showing the relationship between the pre-load amount of the bearing and the starting torque.

As described above, the axial gap of the bearing before the caulking is set to a negative gap. The axial gap of the bearing is obtained by calculating the rotational torque T3 by adding the increment ΔT of the rotational torque obtained from the rotational torque T1, T2, respectively, measured before and after the caulking to the rotational torque T obtained from the axial gap previously measured δ1 before the caulking. The rotational torque T3 is substituted for the relationship formula between the rotational torque and the amount of elastic displacement. Accordingly, it is possible to exclude elements causing the variation of rotational torque such as positive gap of bearing, agitating resistance of lubricating grease sealed within the bearing, the interference of seals, etc. and to exactly and stably set the bearing gap. The axial gap before the connection between the wheel hub and the outer joint member, via plastic deformation, can be stably measured by the rotational torque etc. The bearing gap can be exactly controlled by suppressing the influence of angular run-out of the bearing. In addition it is possible to exactly measure the gap variation due to the plastic deformation. Thus, it is possible to easily obtain an optimum bearing gap and to extend the service life of the bearing.

A region of the outer circumferential surface of the wheel hub 6 that forms a seal land portion, which sealing lips of an outer side seal 23 slides, and the cylindrical portion 6b is hardened by high frequency induction quenching to have a predetermined surface hardness of 58~64 HRC. This improves not only the wear resistance of the seal land portion but the mechanical strength and durability of the wheel hub 6 against the rotary bending moment. It is preferable to leave the fitting portion 20b, that is to be radially expanded, as a non-hardened region having a surface hardness of less than 24 HRC after forging. This sets a difference in hardness of more than 30 HRC as compared to the surface hardness 54~64 HRC of the recessed and projected portion 12 of the wheel hub 6. This enables the recessed and projected portion 12 to easily and deeply bite into the material of the fitting portion 20b. Thus, this rigidly connects the recessed and projected portion 12 and the fitting portion 20b without causing deformation of tips of the projections.

A relation between an outer diameter Da of the fitting surface 10c of the outer member 10, to be fit into the knuckle, and a maximum outer diameter of the joint assembly 32, later mentioned (in this case an outer diameter Db of the cover unit 5), is set as Da≧Db. This makes it possible to mount a previously assembled double row rolling bearing 3 and constant velocity universal joint 1 to the knuckle. Thus, this further improves the workability during assembling of the axle module to a vehicle and during checks or service of the axle module.

Although it is shown as an example, the constant velocity universal joint 1 of a compact type using 8 balls, the present disclosure is not limited to such an example and any constant velocity universal joint satisfying the condition Da≧Db may be used. Thus, a generally used constant velocity universal joint with six balls may be used. In addition any type of constant velocity universal joint may be used in the present disclosure. For example, one with straight track grooves and a so-called "undercut free type" constant velocity universal joint may be used if it is a secured type constant velocity universal joint.

As shown in FIG. 1, one end of the drive shaft 4 is inserted into the joint inner ring 14 of the outer side constant velocity universal joint 1, via a serration 14b. The other end of the drive shaft 4 is inserted into a tripod member 26 of the slide type constant velocity universal joint 2, connected to a differential apparatus (not shown), via a serration 26b.

The inner side slide type constant velocity universal joint 2 includes an outer joint member 25, a tripod member 26 and rollers 28. The tripod member 26 has three legs 26a equidistantly projecting from its outer circumferential surface. The rollers 28 are rollably mounted on the legs 26a, via needle bearings. The outer joint member 25 is made of medium carbon steel including carbon of 0.40~0.80% by weight such as S53C. The outer joint member 25 has a hollow cylindrical portion 29 and a shaft portion 30 that extends from the bottom of the cylindrical portion 29. The shaft portion 30 is formed with serrations 30a on its outer circumferential surface. The serration 30a are to be connected to the differential apparatus.

Three axially extending straight track grooves 29a are formed on the inner circumferential surface of the cylindrical portion 29. The rollers 28 roll on the track groove 29a. The surfaces of the track grooves 29a and the shaft 30 are hardened by high frequency induction quenching to form a predetermined hardened layer of 58~64 HRC. An opening of the cylindrical portion 29 is covered by a synthetic rubber boot 31. The boot 31 prevents leakage of grease contained in the cylindrical portion 29 and ingress of rain water and dusts from outside into the joint member 25. Although a tripod type constant velocity joint is shown as an example of the inner side constant velocity universal joint 2, any sliding type constant velocity universal joint may be used. For example, other tripod type constant velocity joints having a different structure and double offset type constant velocity universal joint (DOJ) may be used.

A cylindrical cover unit 5 is mounted on the outer joint members 7, 25 of the pair of constant velocity universal joints 1, 2, respectively. The cover unit 5 covers the outer circumferential surfaces of the constant velocity universal joints 1, 2 and the drive shaft 4 (hereinafter referred to as "joint assembly"). The cover unit 5 is made by injection molding from an elastomer material such as PA (polyamide) 66. The cover unit 5 is formed from a two-part separated structure, an upper cover 5a and an under cover 5b as shown in FIG. 10. The cover unit 5 has a straight cylindrical outer surface. Its inner surface is formed with a configuration corresponding to the outlines of the outer joint members 7, 25 and boots 17, 31. This protects the joint assembly 32 and prevents the constant velocity universal joints from hanging down under their own weight. Accordingly, it is possible to provide an axle module that is easy to handle during transportation and assembly. This improves the workability during its assembly to a vehicle.

Although the cover unit 5 is shown as an upper and lower separated type parts, any other types of cover unit may be used in the present disclosure that can be radially separated and mounted on the joint assembly from the outside. For example, a three separate part type cover unit may be used or a two part separate type where two halves are connected to each other by a hinge. The cover unit 5 may be made of suitable material such as POM (polyacetal), PBT (polybutyleneterephthalate), PET (polyethyleneterephthalate) etc. other than PA 66. In addition the material forming the cover unit 5 is not limited to these thermoplastic resin and other material obtainably at a low price and providing good formability, such as synthetic rubber, having a predetermined rigidity may also be used.

The outline configuration of the cover unit 5 is not limited to a cylinder and a configuration shown in FIG. 11 may be used. This cover unit 33 has an inner circumferential surface with a configuration corresponding to the outlines of the outer joint members 7, 25 and boots 17, 31, similar to the cover unit 5 previously described. Its outer circumferential surface is a streamlined configuration recessed at substantially its center in an axial direction. This improves the workability during assembly of the axle module to a knuckle and reduces the weight and size of the axle module.

FIG. 12 is a cross-sectional explanatory drawing of a method for mounting the knuckle "N" to the axle module, with the wheel bearing apparatus including the joint assembly 32. The cover unit 5 is mounted on the joint assembly 32. The constant velocity universal joints 1, 2 are prevented from hanging down under their own weight. Thus, their angular attitude is stabled. Accordingly, it is possible to smoothly insert the knuckle "N" from the inner side constant velocity universal joint 2 toward the body mounting flange 10b of the outer member 10 along the outer surface of the cover unit 5, as shown by an arrow. Further, it is possible to prevent the axle module from being contaminated or damaged and thus to keep the mounted condition in place until assembly of a corner module of suspension apparatus or a vehicle is carried out.

A method for assembling the axle module to the knuckle "N", which has already been mounted on a suspension apparatus, will be described in detail using FIG. 13. In this case only the lower cover 5b of the cover unit 5 is used. The joint assembly 32 on which the lower cover 5b is mounted to prevent hanging down of the constant velocity universal joints 1, 2 under its own weight is inserted into the knuckle "N". The lower cover is in contact with an inner circumferential surface of a bore of the knuckle "N" and slide on it as shown by an arrow. This reduces the weight of the axle module itself and increases a radial space between the knuckle "N" and the axle module and thus improves the workability during assembly.

Although it is shown, for example, as a wheel bearing apparatus of the fourth generation type formed as a unit in combination with the wheel hub 6, the double row rolling bearing 3, and the constant velocity universal joint 1, it should be noted that a wheel bearing apparatus of the third generation type, where the constant velocity universal joint is detachably connected via a serration, may be used. The cover unit 5 is intended to be used to protect the joint assembly 32 and to improve the workability during assembly of the axle module.

FIG. 14 is a longitudinal section view of a second embodiment of an axle module. FIG. 15 is a longitudinal section view of a wheel bearing apparatus of FIG. 14. FIG. 16(a) is a longitudinal section view of a knuckle. FIG. 16(b) is a front elevation view of FIG. 16(a). FIG. 17 is a cross-sectional explanatory view of a method for assembling the axle module to a vehicle. The same reference numerals are used to designate the same parts as those having the same functions used in the first embodiment.

This axle module of the present disclosure is intended to transmit power from an engine to a wheel and to rotationally support the wheel relative to a suspension apparatus of a vehicle. The fundamental structure of the axle module includes a wheel bearing apparatus formed as a unit of a wheel hub 6, double row rolling bearing 3 and a secured type constant velocity universal joint 1. The slide type constant velocity universal joint 2 is connected to the constant velocity universal joint 1 via a drive shaft 4.

In this embodiment the maximum outer diameter Dc of the constant velocity universal joint 2 forms an outer diameter of a boot 31.

As shown in the enlarged view of FIG. 15, the wheel bearing apparatus has a structure of the fourth generation type where the wheel hub 6, the double row rolling bearing 3, and the constant velocity universal joint 1 is formed as a unit. The outer member 10 of the double row rolling bearing 3 is integrally formed with a body mounting flange 10b on its outer circumferential surface. The body mounting flange 10b is to be mounted on the knuckle N1 forming a part of the suspension apparatus. The fitting surface 10c, to be fit into the knuckle N1, is formed on the inner side body mounting flange 10b.

A bellows shaped boot 17, for example of thermoplastic resin, is mounted on the outer circumferential portion, at an opening side of the mouth portion 18, and on the drive shaft 4. The boot 17 enables the outer joint member 7 to bend relative to the drive shaft 4 and prevents, with a cooperating end cap 21 mounted on the hollow shaft portion 20, grease contained within the mouth portion 18 from being leaked and rain water or dusts from entering into the inside of the bearing. A boot 17 made of plastic resin has high strength and durability. Its rigidity is higher than that of a conventional boot made of synthetic resin. Thus it is necessary to fasten its opened end by a boot band 35. The boot band 35 is formed on its outer circumferential surface with circumferentially extending pleats (not shown) and also with a projection 35*a*. The projection 35*a* is caulked to reduce the diameter of the boot band 35 in order to uniformly and rigidly fasten the boot 17.

In this embodiment since the boot 17 is secured by the caulking type boot band 35, the projection 35*a* project radially outward further than the outer diameter of the boot 17, which forms the maximum outer diameter Db of the constant velocity universal joint 1. Accordingly, since the outer diameter of the projection 35*a* is larger than the outer diameter (i.e. the inner diameter of the knuckle N1) Da of the fitting surface 10*c* of the outer member 10, the knuckle N1 cannot pass through the outer diameter of the constant velocity universal joint 1. Thus assembly of the wheel bearing apparatus to a vehicle is impossible.

Figure 16:
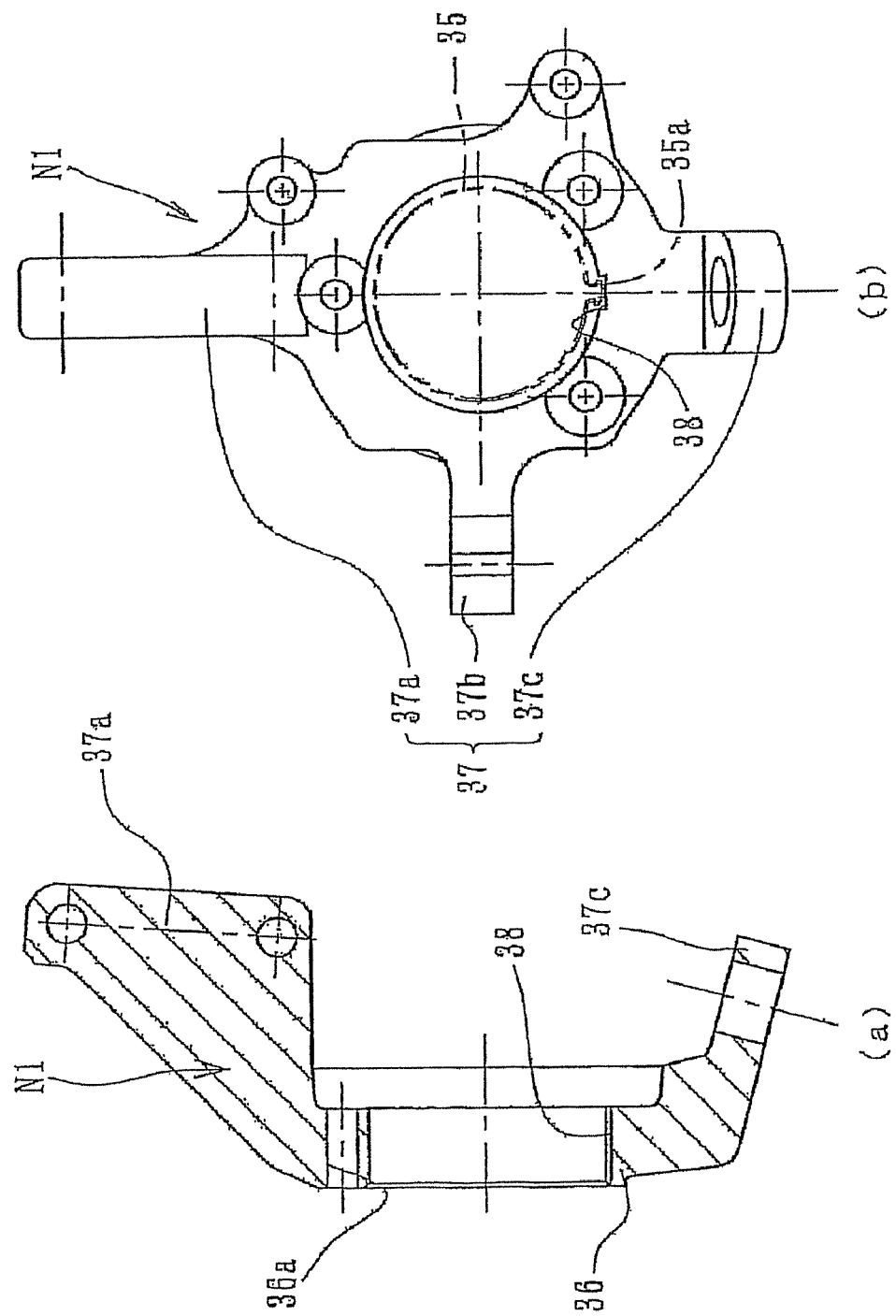

As shown in FIG. 16, the knuckle N1 includes a securing portion 36 adapted to be fit onto the fitting surface 10*c* of the outer member 10. A connecting portion 37 including arms 37*a*, 37*b*, 37*c* are to be connected to a suspension apparatus (not shown). In this embodiment the securing portion 36 is formed with bolt apertures 36*a* to secure bolts (not shown). An axially extending slit 38, having a substantially rectangular cross section, permits passage of the projection 35*a* of the boot band 35. This slit 38 enables assembly of the constant velocity universal joint 1 to a vehicle by inserting it into the knuckle N1 without the knuckle N1 interfering with the boot band 35. Thus, projection 35*a* is aligned with the slit 38. In addition, the maximum outer diameter of the inner side constant velocity universal joint 2 (in this case the outer diameter of the boot 31) Dc is set smaller than the maximum outer diameter of the outer side constant velocity universal joint 1 (in this case the outer diameter of the boot 17) Db. Thus, it is possible to assemble the axle module with the pair of constant velocity universal joints 1, 2, drive shaft 4 connected to these constant velocity universal joints 1, 2, and wheel bearing apparatus as a unit to a vehicle. In other words, it is possible to easily assemble the axle module to the knuckle N1, to realize modularization of a suspension and its related parts. Thus, this further improves the workability during assembly of a vehicle.

A method for inserting the knuckle N1 onto the axle module is shown using FIG. 17.

The knuckle N1 is passed over the constant velocity universal joint 2 from the inner side (right hand side in FIG. 17). The knuckle N1 is moved toward the constant velocity universal joint 1 with the slit 38 formed on the knuckle N1 aligned with the boot band projection 35*a*. The knuckle N1 is fit onto the fitting surface 10*c* of the outer member 10. Finally the knuckle N1 is fastened to the outer member 10 by bolts (not shown).

According to this embodiment, the knuckle N1 is formed with the slit 38 to enable passage of the boot band projection 35*a*. Thus, it is possible to pass the knuckle N1 over the axle module and reduce the weight and size of the knuckle N1 and its related suspension parts. Additionally, this improves the workability during assembly of the axle module to a vehicle.

The wheel bearing apparatus of the present disclosure can be applied to wheel bearing apparatus of the fourth generation type where the wheel hub forming the bearing portion and the outer joint member of the constant velocity universal joint are united with each other, via plastic deformation. The cover unit is mounted onto the constant velocity universal joints and a connecting drive shaft. This forms a power transmitting apparatus of a vehicle for protecting the constant velocity universal joints and improving the workability during assembly and can be applied to an axle module of any power transmitting apparatus despite the types of constant velocity universal joints and wheel bearings.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A wheel bearing apparatus of an united combination of a wheel hub, a double row rolling bearing and a constant velocity universal joint comprising:

an outer member integrally formed with a body mounting flange on its outer circumferential surface and with double row outer raceway surface on its inner circumferential surfaces;

an inner member including a wheel hub integrally formed with a wheel mounting flange on one end, one inner raceway surface formed on its outer circumferential surface, the one inner raceway surface opposite to one of the double row outer raceway surfaces, and a cylindrical portion axially extends from the one inner raceway surface, an outer joint member forming the constant velocity universal joint is formed with another inner raceway surface on its outer circumferential surface, the another inner raceway surface is opposite to the other one of the double row outer raceway surfaces, a shaft portion axially extends from the another inner raceway surface and is adapted to be fit into the wheel hub;

a plurality of rolling elements are freely rollably contained between the inner and outer raceway surfaces, respectively, of the inner member and the outer member;

the wheel hub and the outer joint member are integrally connected via plastic caulking deformation by radially expanding a fitting portion of the shaft portion of the outer joint member, a hardened recessed and projected portion formed on the inner circumferential surface of the wheel hub bites into the outer circumferential surface of the shaft portion of the outer joint member;

the recessed and projected portion is a crossed-groove formed by crossing substantially orthogonally a plurality of annular independent grooves formed axially along the inner circumferential surface of the wheel hub and a plurality of axial grooves formed equidistantly along the inner circumferential surface of the wheel hub, the diameter of the bottom of the annular groove is set smaller than the diameter of the bottom of the axial groove improving machining accuracy by suppressing vibration during the machining process avoiding discontinuing cutting during formation of the axial grooves after the formation of the annular grooves; and the biting of the hardened recessed and projected portion of the wheel hub into the shaft portion of the outer joint member is performed so that material of the shaft portion does not extend to the bottoms of the axial grooves and thus voids remain in the recessed portions of the axial grooves.

2. The wheel bearing apparatus of claim 1 wherein the cross sectional configuration of each axial groove is formed by a recess with a circular arc and a projection is formed by substantially straight lines, and wherein the biting of the recessed and projected portion into the shaft portion is suppressed by the projections so that the void can remain in the recess.

3. The wheel bearing apparatus of claim 2 wherein the included angle of the projection is set to substantially 90°.

4. A wheel bearing apparatus of claim 1 further comprising:
 a bearing axial gap being formed between the wheel hub and the outer joint member before the plastic deformation connecting them, the gap becoming an interference fit after the deformation.

5. The wheel bearing apparatus of claim 4 wherein the axial gap between the wheel hub and the outer joint member before the plastic deformation connecting them, is increased by the plastic deformation connection and set to a predetermined axial gap.

6. The wheel bearing apparatus of claim 4 wherein the wheel hub and the outer joint member are integrally connected via a plastic caulking deformation by radially expanding the shaft portion of the outer joint member and by biting a hardened recessed and projected portion formed on the inner circumferential surface of the wheel hub into the outer circumferential surface of the shaft portion of the outer joint member.

7. A wheel bearing apparatus comprising:
 an outer member integrally formed with a body mounting flange adapted to be mounted on a knuckle and formed with double row outer raceway surfaces on its inner circumferential surface;
 an inner member including a wheel hub freely rollably supported on the outer member and a wheel mounting flange integrally formed at one end on the wheel hub, and the wheel hub outer circumferential surface has one inner raceway surface opposite to one of the double row outer raceway surfaces, a cylindrical portion axially extends from the one inner raceway surface, an outer joint member of a constant velocity universal joint is formed, on its outer circumferential surface, with another inner raceway surface opposite to the other one of the double row outer raceway surfaces, a shaft portion axially extends from the another inner raceway surface and is adapted to fit into the wheel hub;
 a plurality of rolling elements are freely rollably contained between the inner member and the outer member;
 the wheel hub and the outer joint member are integrally connected via a plastic caulking deformation of the shaft portion of the outer joint member onto the inner circumferential surface of the wheel hub;
 an axially extending slit, having a substantially rectangular cross section, is formed on the inner circumferential surface of the knuckle an extends axially through the knuckle;
 a boot is mounted on the outer joint member;
 a boot band for fastening the boot has on its outer circumferential surface a projection projecting radially outward beyond the maximum outer diameter of the constant velocity universal joint;
 the boot is secured on the outer joint member by caulking the projection to reduce the diameter of the boot band; and
 the configuration and dimension of the projection are determined so that the projection can pass through the slit of the knuckle.

* * * * *

UNITED STATES PATENT AND TRADEMARK OFFICE
CERTIFICATE OF CORRECTION

| | | |
|---|---|---|
| PATENT NO. | : 8,057,314 B2 | Page 1 of 1 |
| APPLICATION NO. | : 12/782959 | |
| DATED | : November 15, 2011 | |
| INVENTOR(S) | : Mitsuru Umekida et al. | |

It is certified that error appears in the above-identified patent and that said Letters Patent is hereby corrected as shown below:

<u>Column 12</u>
Line 40, "8" should be --8--.

Signed and Sealed this
Fifteenth Day of May, 2012

David J. Kappos
*Director of the United States Patent and Trademark Office*